(12) United States Patent
Brown et al.

(10) Patent No.: US 12,554,177 B2
(45) Date of Patent: Feb. 17, 2026

(54) SHAPE MEMORY ALLOY ACTUATION APPARATUS

(71) Applicant: CAMBRIDGE MECHATRONICS LIMITED, Cambridge (GB)

(72) Inventors: Andrew Brown, Cambridge (GB);
Stephen Bunting, Cambridge (GB);
Daniel Burbridge, Cambridge (GB);
Oliver Hart, Cambridge (GB);
Nicholas Heijne, Cambridge (GB);
James Howarth, Cambridge (GB);
Marc-Sebastian Scholz, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 1059 days.

(21) Appl. No.: 17/253,696

(22) PCT Filed: Jun. 21, 2019

(86) PCT No.: PCT/GB2019/051771
§ 371 (c)(1),
(2) Date: Dec. 18, 2020

(87) PCT Pub. No.: WO2019/243849
PCT Pub. Date: Dec. 26, 2019

(65) Prior Publication Data
US 2021/0263392 A1    Aug. 26, 2021

(30) Foreign Application Priority Data

Jun. 21, 2018  (GB) ...................................... 1810207
Dec. 19, 2018  (GB) ...................................... 1820664

(51) Int. Cl.
*G03B 3/10*      (2021.01)
*F03G 7/06*      (2006.01)
(Continued)

(52) U.S. Cl.
CPC ............... *G03B 3/10* (2013.01); *F03G 7/065* (2013.01); *G02B 7/005* (2013.01); *G03B 5/00* (2013.01);
(Continued)

(58) Field of Classification Search
CPC .... G03B 3/10; G03B 5/00; G03B 2205/0046; G03B 2205/0076; F03G 7/065;
(Continued)

(56) References Cited

U.S. PATENT DOCUMENTS

2004/0263299 A1*  12/2004  Noji ........................ F16F 6/00
                                                    335/229
2007/0177908 A1*  8/2007  Aruga ................ G03G 15/0818
                                                    399/286
(Continued)

FOREIGN PATENT DOCUMENTS

CN    102162898 A     8/2011
CN    109975972 A     7/2019
(Continued)

OTHER PUBLICATIONS

ManufacturingET.org. (Oct. 19, 2011). Screw Thread. http://www.manufacturinget.org/2011/10/screw-thread/ A screw thread, often shortened to thread, is a helical structure used to convert between rotational and linear movement or force. (Year: 2011).*

*Primary Examiner* — Sharrief I Broome
*Assistant Examiner* — K Muhammad
(74) *Attorney, Agent, or Firm* — Van Hoven PC; Stefan D. Osterbur; Joshua Van Hoven

(57) ABSTRACT

A shape memory alloy actuation apparatus comprises a support structure (2) and a movable element (10). A helical bearing arrangement (20) supporting the movable element on the support structure guides helical movement of the movable element with respect to the support structure
(Continued)

around a helical axis (H). At least one shape memory alloy actuator wire (60) is connected between the support structure and the movable element in, or at an acute angle to, a plane normal to the helical axis, so as to drive rotation of the movable element around the helical axis which the helical bearing arrangement converts into said helical movement.

31 Claims, 16 Drawing Sheets

(51) Int. Cl.
*G02B 7/00* (2021.01)
*G03B 5/00* (2021.01)
*H04N 23/69* (2023.01)

(52) U.S. Cl.
CPC ..... *H04N 23/69* (2023.01); *G03B 2205/0046* (2013.01); *G03B 2205/0076* (2013.01)

(58) Field of Classification Search
CPC ....... F03G 7/06; F03G 7/06143; G02B 7/005; G02B 7/08; H04N 23/69; F05B 2280/5006
See application file for complete search history.

(56) References Cited

U.S. PATENT DOCUMENTS

| | | |
|---|---|---|
| 2009/0244731 A1 | 10/2009 | Yu |
| 2009/0283377 A1 | 11/2009 | Roe |
| 2010/0060778 A1* | 3/2010 | Tsuchiya ............... H04N 23/57 348/340 |
| 2010/0074607 A1* | 3/2010 | Topliss ..................... G02B 7/08 60/527 |
| 2013/0269174 A1* | 10/2013 | Park ..................... A61B 8/4461 29/594 |
| 2014/0123789 A1 | 5/2014 | Saunders et al. |
| 2017/0336646 A1* | 11/2017 | Miller ..................... H04N 23/67 |
| 2020/0028996 A1* | 1/2020 | Feng ........................ G02B 7/08 |

FOREIGN PATENT DOCUMENTS

| | | | |
|---|---|---|---|
| DE | 19730383 A1 * | 1/1999 | ............. C22F 1/006 |
| JP | 2004069986 | 3/2004 | |
| JP | 2004184776 | 7/2004 | |
| JP | 2005083291 | 3/2005 | |
| JP | 2005083332 | 5/2005 | |
| JP | 2006038931 | 2/2006 | |
| WO | WO 2008099155 | 8/2008 | |
| WO | WO-2017181991 A1 * | 10/2017 | |

\* cited by examiner

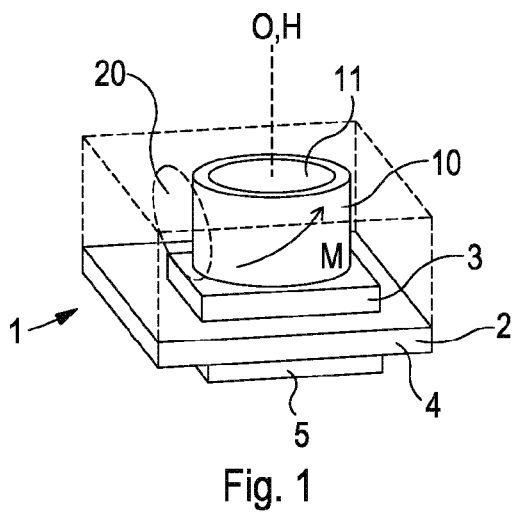
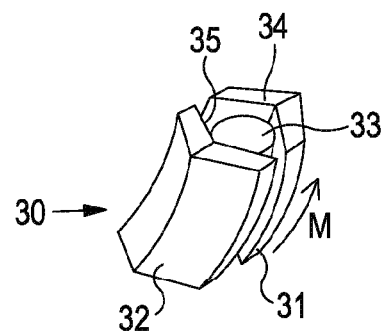
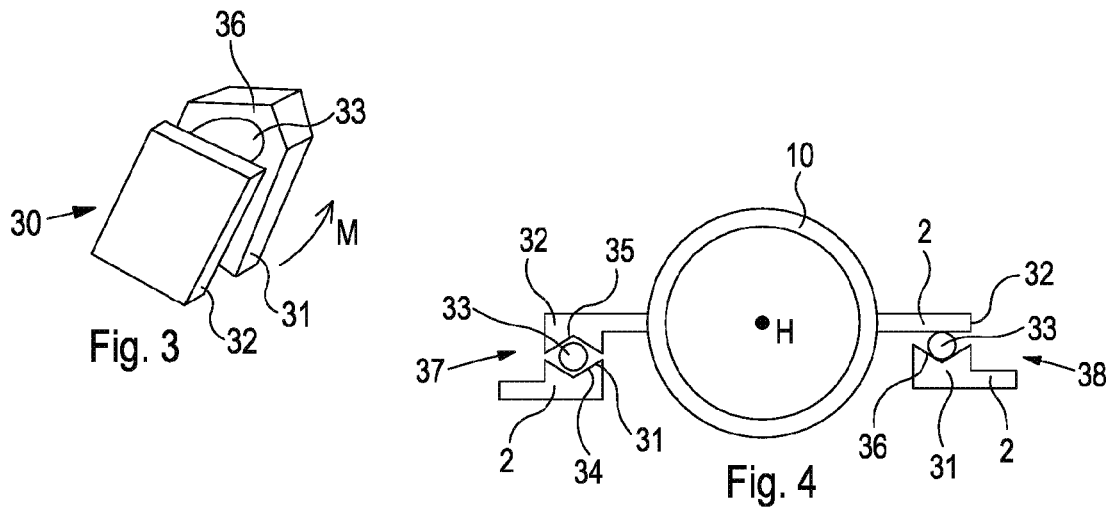
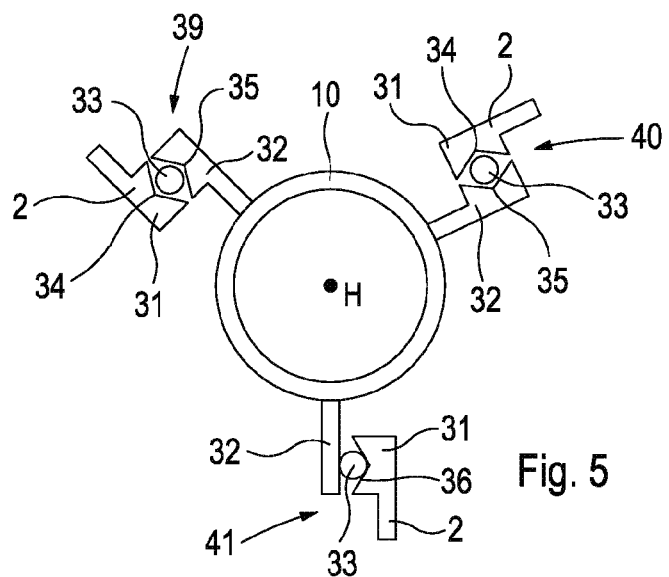

SHAPE MEMORY ALLOY ACTUATION APPARATUS

CROSS-REFERENCE TO RELATED APPLICATIONS

This application is a national stage application under 35 U.S.C. § 371 of International Application PCT/GB2019/051771, filed Jun. 21, 2019, which claims priority of GB Patent Applications 1810207.9, filed Jun. 21, 2018 and 1820664.9, filed Dec. 12, 2019. The disclosure of which are hereby incorporated by reference herein in their entireties.

The present disclosure relates to a shape memory alloy (SMA) actuation apparatus in which at least one SMA actuator wire drives movement of a movable element with respect to a support structure.

It is known to use an SMA wire as an actuator to drive translational movement of a movable element with respect to a support structure. SMA actuator wires have particular advantages in miniature devices and may be applied in a variety of devices including handheld devices, such as cameras and mobile phones. Such SMA actuator wires may be used for example in an optical device such as a camera for driving translational movement of a camera lens element along its optical axis, for example to effect focusing (auto-focus, AF) or zoom.

Some examples of an SMA actuation apparatuses which are cameras of this type are disclosed in WO-2007/113478. Herein, the movable element is a camera lens element supported on a support structure by a helical bearing arrangement comprising flexures that guide translational movement along the optical axis. In one example described herein, the SMA actuator wire is a piece of SMA wire connected at its ends to a support structure and hooked over a hook on a camera lens element for driving the translational movement. The straight SMA actuator wires formed by the portions of the piece of SMA wire on either side of the hook extend at an acute angle of greater than 0 degrees to the movement direction parallel to the optical axis. Angling the SMA actuator wires in this way increases the amount of movement compared to an SMA actuator wire extending along the movement direction and also reduces the extent of the actuator in the movement direction.

Miniaturisation is an important design criteria in many types of SMA actuation apparatus. In many applications, it is desirable to minimise the size of the SMA actuation apparatus in the movement direction. For example, where the SMA actuation apparatus comprises a lens element that is moved along the optical axis, it is desirable to minimise the size along the optical axis.

In an SMA actuation apparatus in which SMA actuator wires extend at an acute angle to the movement direction, as in the camera disclosed in WO-2007/113478 for example, the SMA actuator wires themselves necessarily have an extent projected along the movement direction. This places a minimum size on the SMA actuation apparatus along the movement direction, even if other components may be made smaller in that direction. In particular, the extent of the SMA actuator wires projected along the movement direction is determined by the required degree of translational movement required, because the maximum change in length of the SMA actuator wires is a given percentage of the overall length of the SMA actuator wires, this resulting from the electromechanical properties of the SMA material.

Thus, the SMA actuator wires in such an arrangement constrain the reduction in size along the movement direction and it would however be desirable to reduce this constraint.

According to the present disclosure, there is provided a shape memory alloy actuation apparatus comprising: a support structure; a movable element; a helical bearing arrangement supporting the movable element on the support structure and arranged to guide helical movement of the movable element with respect to the support structure around a helical axis; and at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

This type of SMA actuation apparatus makes use of a helical bearing arrangement which guides helical movement of the movable element with respect to the support structure. Such helical movement involves rotation around a helical axis together with an overall translation along the helical axis. Thus, the SMA actuator wire is connected between the support structure and the movable element so as to drive rotation of the movable element around the helical axis. The rotation driven by contraction of the SMA actuator wire is converted by the helical bearing arrangement into helical movement of the movable element. Thus, translational movement of the movable element is achieved along the helical axis as part of the helical movement.

As the SMA actuator wire has the primary purpose of driving rotation, the extent of the SMA actuator wire projected along the helical axis may be minimised, such that some other component of the SMA actuation apparatus determines the size of the actuator in the direction of the helical axis along which translational movement is achieved.

In some embodiments, the SMA actuator wire may extend in a plane normal to the helical axis. In that case, the SMA actuator wire has a minimum extent projected along the helical axis.

In other embodiments, the SMA actuator wire may extend at an acute angle to a plane normal to the helical axis. In that case, the SMA actuator wire has an extent projected along the helical axis, but this may be controlled by adjusting the acute angle to fit within the size constraint of some other component of the SMA actuation apparatus.

Various different types of helical bearing arrangement may be used to guide the helical movement of the movable element with respect to the support structure. For example, the helical bearing arrangement may comprise at least one rolling or sliding bearing, or may comprise at least one flexure extending between the support structure and the movable element.

Similarly, various different configurations for the SMA actuator wires may be used to drive rotation of the movable element around the helical axis. For example, there may be a single SMA actuator wire or plural SMA actuator wires disposed at any positions around the helical axis.

In a first type of embodiment, a resilient biasing element may be connected between the support structure and the movable element and arranged to resiliently bias the at least one SMA actuator wire. In general terms, use of a resilient biasing element with an SMA actuator wire is known, the resilient biasing element applying a stress to the SMA actuator wire and driving movement in the opposite direction from contraction of the SMA actuator wire. Such a resilient biasing element may be employed with a single SMA actuator wire or plural SMA actuator wires.

In a second type of embodiment, a pair of SMA actuator wires may be arranged, on contraction, to drive rotation of the movable element in opposite senses around the helical axis. Whereas use of a pair of SMA actuator wires that apply opposed forces to an element in translation is known in general terms, here the SMA actuator wires apply opposed torques around the helical axis. However, in a similar manner to known uses of opposed SMA actuator wires, the SMA actuator wires apply a stress to each other and, on contraction, drive rotation of the lens element in the opposite directions around the helical axis.

Particular advantage is achieved when applied to an SMA actuation apparatus in which the movable element is a lens element comprising at least one lens, for example where the helical axis is the optical axis of the lens element. There are many applications where it is desirable to minimise the size along the direction of translational movement of such a lens element. For example, the SMA actuation apparatus may be a camera wherein the support structure has an image sensor mounted thereon and the lens element is arranged to focus an image on the image sensor. The advantages of size reduction achieved by the present techniques are particularly valuable in a handheld device where space is at a premium and in a miniature device, for example wherein the at least one lens has a diameter of at most 20 mm, preferably at most 15 mm, preferably at most 10 mm.

However, the present techniques may in general be applied to any type of device that comprises a static part and a moveable part which is moveable with respect to the static part. By way of non-limitative example, the actuator assembly may be, or may be provided in, any one of the following devices: a smartphone, a camera, a foldable smartphone, a foldable smartphone camera, a foldable consumer electronics device, an image capture device, a foldable image capture device, an array camera, a 3D sensing device or system, a servomotor, a consumer electronic device (including domestic appliances), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), a security system, a gaming system, a gaming accessory (e.g. controller, headset, a wearable controller, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle. It will be understood that this is a non-exhaustive list of example devices.

Actuator assemblies as described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

To allow better understanding, embodiments of the present techniques will now be described by way of non-limitative example with reference to the accompanying drawings, in which:

FIG. 1 is a schematic view of an SMA actuation apparatus that is a camera;

FIGS. 2 and 3 are perspective views of two helical bearings;

FIGS. 4 to 7 are schematic cross-sectional views of the SMA actuation apparatus with different possible helical bearing arrangements;

Figure 6:
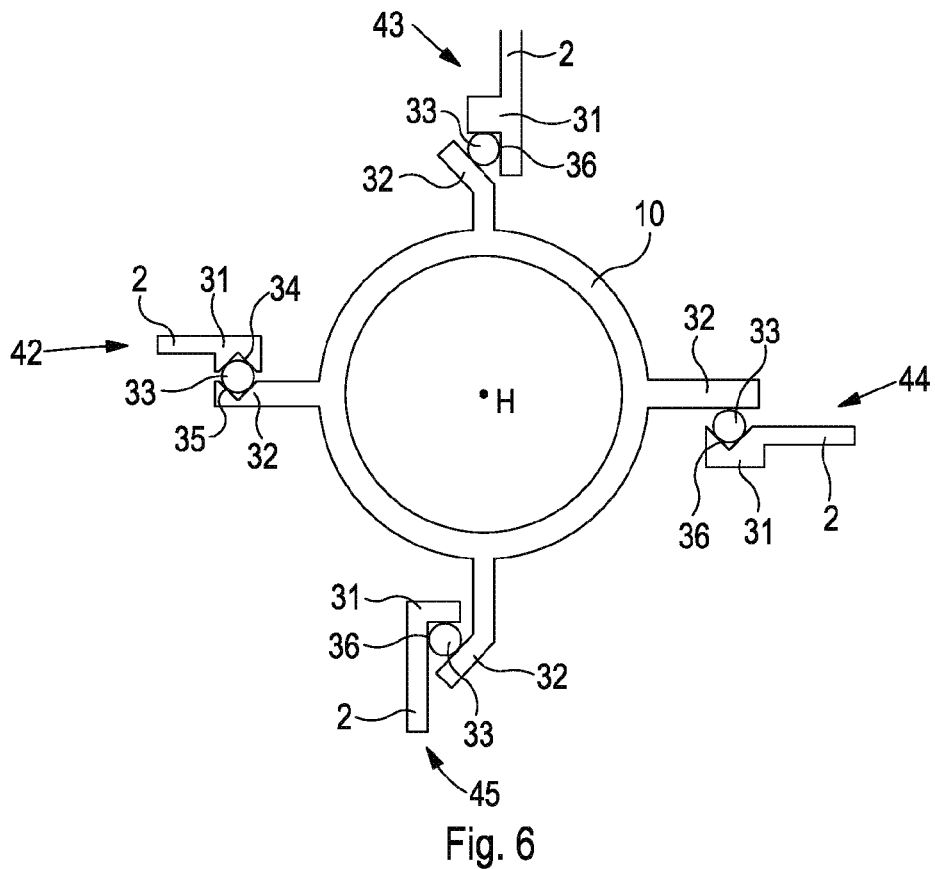

Except where the context requires otherwise, the term "bearing" is used herein as follows. The term "bearing" is used herein to encompass the terms "sliding bearing", "plain bearing", "rolling bearing", "ball bearing", "roller bearing", an "air bearing" (where pressurised air floats the load) and "flexure". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. Such a rolling bearing element may be a compliant element, for example a sac filled with gas. In embodiments, the bearing may be provided on, or may comprise, non-linear bearing surfaces.

In some embodiments of the present techniques, more than one type of bearing element may be used in combination to provide the bearing functionality. Accordingly, the term "bearing" used herein includes any combination of, for example, plain bearings, ball bearings, roller bearings and flexures.

An SMA actuation apparatus 1 that is a camera is shown schematically in FIG. 1.

The SMA actuation apparatus 1 comprises a support structure 2 that has an image sensor 3 mounted thereon. The support structure 2 may take any suitable form, typically including a base 4 to which the image sensor is fixed. The support structure 2 may also support an IC chip 5 described further below.

The SMA actuation apparatus 1 also comprises a lens element 10 that is the movable element in this example. The lens element 10 comprises a lens 11, although it may alternatively comprise plural lenses. The lens element 10 has an optical axis O aligned with the image sensor 3 and is arranged to focus an image on the image sensor 3.

The SMA actuation apparatus 1 is a miniature device. In some examples of a miniature device, the lens 11 (or plural lenses, when provided) may have a diameter of at most 20 mm, preferably at most 15 mm, preferably at most 10 mm.

Although the SMA actuation apparatus 1 in this example is a camera, that is not in general essential. In some examples, the SMA actuation apparatus 1 may be an optical device in which the movable element is a lens element but there is no image sensor. In other examples, SMA actuation apparatus 1 may be a type of apparatus that is not an optical device, and in which the movable element is not a lens element and there is no image sensor. Examples include apparatuses for depth mapping, face recognition, game consoles, projectors and security scanners.

The SMA actuation apparatus 1 also comprises a helical bearing arrangement 20 (shown schematically in FIG. 1) that supports the lens element 10 on the support structure 2. The helical bearing arrangement 20 is arranged to guide helical movement of the lens element 10 with respect to the support structure 2 around a helical axis H. The helical axis H in this example is coincident with the optical axis O and the helical movement is shown in FIG. 1 by the arrow M.

Preferably, the helical motion is along a right helix, that is a helix with constant radius, but in general any helix is possible. The pitch of the helix may be constant or vary along the helical motion. Preferably, the helical movement is generally only a small portion (less than one quarter) of a full turn of the helix.

The helical motion of the lens element 10 guided by the helical bearing arrangement 20 includes a component of translational movement along the helical axis H and rotational movement around the helical axis H. The translational movement along the helical axis H is the desired movement of the lens element 10, for example to change the focus of the image on the image sensor 3 and/or to change the magnification (zoom) of the image on the image sensor 3. The rotational movement around the helical axis H is in this example not needed for optical purposes, but is in general acceptable as rotation of the lens element 10 does not change the focus of the image on the image sensor 3.

The helical bearing arrangement 20 may take a variety of forms.

One possibility is that the helical bearing arrangement 20 comprises one or more helical bearings 30 that are rolling bearings, examples of which are shown in FIGS. 2 and 3. In each of FIGS. 2 and 3, the helical bearing 30 comprises a pair of helical bearing surfaces 31 and 32 and plural rolling bearing elements 33, for example balls, disposed between the bearing surfaces 31 and 32. One of the bearing surfaces 31 and 32 is provided on the support structure 2 and the other of the bearing surfaces 31 and 32 is provided on the lens element 10.

The helical bearing 30 guides the helical movement of the lens element 10 with respect to the support structure 2 as shown by the arrow M. This may be achieved by the helical bearing surfaces 31 and 32 extending helically around the helical axis H, that is following a line that is helical. That said, in practical embodiments, the length of the bearing surfaces 31 and 32 may be short compared to the distance of the bearing surfaces 31 and 32 from the helical axis H, such that their shape is close to straight or even each being straight, provided that the one or more helical bearings of the helical bearing arrangement 20 guide helical movement of the lens element 10 with respect to the support structure 2. Plural helical bearings 30 are typically present, located at different angular positions around the helical axis H, in which case the helical bearings 30 have different orientations so that they cooperate and maintain adequate constraints to guide the helical movement of the lens element 10 with respect to the support structure 2, even if the bearing surfaces 31 and 32 of an individual helical bearing 30 are straight.

In the example of FIG. 2, the bearing surfaces 31 and 32 each comprise respective grooves 34 and 35 in which the rolling bearing elements 33 are seated. In this example, the grooves 34 and 35 constrain transverse translational movement of the lens element 10 with respect to the support structure 2, that is transverse to the direction of movement shown by arrow M. The grooves shown in FIG. 2 are V-shaped in cross-section, but other cross-sections are possible, for example curved as in portions of a circle or an oval. In general, the grooves 34 and 35 provide two points of contact with the respective rolling bearing elements 33. The grooves 34 and 35 may extend helically. Alternatively, in practical embodiments, the length of the bearing surfaces 31 and 32 may be short compared to the distance of the bearing surfaces 31 and 32 from the helical axis H, in which case the grooves 34 and 35 may be straight or close to straight, provided that the one or more helical bearings 30 of the helical bearing arrangement 20 guide helical movement of the lens element 10 with respect to the support structure 2.

In the example of FIG. 3, a first bearing surface 31 comprises a groove 36 in which the rolling bearing elements 33 are seated and a second bearing surface 32 wherein the bearing surface is 'planar'. The first bearing surface 31 comprising a groove 36 may be provided on either one of the support structure 2 and the lens element 10, with the second bearing surface 32 being provided on the other one of the support structure 2 and the lens element 10. In the example of FIG. 3, the helical bearing 30 does not constrain transverse translational movement of the lens element 10 with respect to the support structure 2, that is transverse to the direction of movement shown by arrow M. The bearing surface 32 is 'planar' in the sense that it is a surface which is not a groove and one which provides only a single point of contact with the ball. In other words, the bearing surface 32 is effectively planar across a scale of the width of the rolling bearing element 33, although be helical at a larger scale. For example, as pictured, the 'planar' surface is helical, being a line in cross section which twists helically along the movement direction, maintaining a single point of contact with the ball at any time. Alternatively and as mentioned above, in practical embodiments the length of the bearing surfaces 31 and 32 may be short, in which case the bearing surface 32 may be planar or close to planar, provided that the one or more helical bearings 30 of the helical bearing arrangement 20 guide helical movement of the lens element 10 with respect to the support structure 2.

A single rolling bearing element 33 is shown in FIGS. 2 and 3 by way of example, but in general may include any plural number of rolling bearing elements 33.

In some examples, the helical bearing 30 may include a single rolling bearing element 33. In that case, the helical bearing 30 by itself does not constrain the rotational movement of the lens element 10 with respect to the support structure 2 about the single rolling bearing element 33, that is around an axis transverse to the direction of movement shown by arrow M. However, this minimises the overall size of the helical bearing 30, and in particular the height of the helical bearing 30 projected along the helical axis H as it is only needed to accommodate the size of the rolling bearing element 33 and the relative travel of the bearing surfaces 31 and 32.

In other examples, the helical bearing 30 may include plural rolling bearing element 33. In that case, the helical bearing 30 constrains the rotational movement of the lens element 10 with respect to the support structure 2 about either one of the rolling bearing elements 33, that is around an axis transverse to the direction of movement shown by arrow M. However, compared to use of a single rolling bearing element 33, this increases the overall size of the helical bearing 30, and in particular the height of the helical bearing 30 projected along the helical axis H.

The helical bearing arrangement may in general comprise any number of helical bearings 30 with a configuration chosen to guide the helical movement of the lens element 10 with respect to the support structure 2 while constraining the movement of the lens element 10 with respect to the support structure 2 in other degrees of freedom. Many helical bearing arrangements may comprise plural helical bearings 30 and at least one which comprises plural rolling bearing elements 30.

Some specific examples of the SMA actuation apparatus 1 with different possible helical bearing arrangements are illustrated in FIGS. 4 to 6 which are schematic plan views normal to the helical axis showing the support structure 2, the lens element 10 and the helical bearings 30.

FIG. 4 illustrates a possible helical bearing arrangement that includes two helical bearings 37 and 38 only. The helical bearings 37 and 38 are arranged on opposite sides of the lens element 2.

The first helical bearing 37 is of the same type as the helical bearing 30 shown in FIG. 2 wherein the bearing surfaces 31 and 32 each comprise respective grooves 34 and 35. The first helical bearing 37 includes plural rolling bearing elements 33 to constrain the relative movement of the lens element 10 and the support structure 2.

The second helical bearing 38 is of the same type as the helical bearing 30 shown in FIG. 3 wherein the first bearing surface 31 comprises a groove 36 in which the rolling bearing elements 33 are seated and the second bearing surface 32 is planar.

FIG. 4 illustrates the case that the first bearing surface 31 of the second helical bearing 38 is on the support structure 2, but it could alternatively be on the lens element 10. The second helical bearing 38 may comprise a single rolling bearing element 33 or plural rolling elements 33 and principally adds a constraint against relative rotation of the lens element 10 and the support structure 2 around the direction of movement (arrow M) of the first helical bearing 37.

The helical bearing arrangement of FIG. 4 includes a smaller number of helical bearings (i.e. two) than the other examples below, which simplifies the construction and reduces footprint of the SMA actuation apparatus 1.

FIG. 5 illustrates a possible helical bearing arrangement that includes three helical bearings 39, 40 and 41 only. The three helical bearings 39, 40 and 41 are equally angularly spaced around the helical axis H, but they could alternatively be spaced unequally.

The first and second helical bearings 39 and 40 are of the same type as the helical bearing 30 shown in FIG. 2 wherein the bearing surfaces 31 and 32 each comprise respective grooves 34 and 35.

The third helical bearing 41 is of the same type as the helical bearing 30 shown in FIG. 3 wherein the first bearing surface 31 comprises a groove 36 in which the rolling bearing element 33 is seated and the second bearing surface 32 is planar. FIG. 5 illustrates the case that the first bearing surface 31 of the third helical bearing 41 is on the lens element 10, but it could alternatively be on the support structure 2.

Each of the three helical bearings 39, 40 and 41 may comprise a single rolling or plural bearing elements 33. This is possible because the constraints imposed by three helical bearings 39, 40 and 41, and in particular the grooves of the first and second helical bearings 39 and 40 sufficient to constrain the movement of the lens element 10 with respect to the support structure 2 in degrees of freedom other than the helical movement. As a result of using only a single rolling bearing element 33 in each of the three helical bearings 39, 40 and 41, the overall size of the three helical bearings 39, 40 and 41, and in particular the height of the three helical bearings 39, 40 and 41 projected along the helical axis H is reduced compared to the helical bearing arrangement of FIG. 4.

FIG. 6 illustrates a possible helical bearing arrangement that includes four helical bearings 42 to 45 only. The four helical bearings 42 to 45 are equally angularly spaced around the helical axis H.

The first helical bearing 42 is of the same type as the helical bearing 30 shown in FIG. 2 wherein the bearing surfaces 31 and 32 each comprise respective grooves 34 and 35.

The second, third and fourth helical bearings 43, 44 and 45 are each of the same type as the helical bearing 30 shown in FIG. 3 wherein the first bearing surface 31 comprises a groove 36 in which the rolling bearing element 33 is seated and the second bearing surface 32 is planar. FIG. 6 illustrates the case that the first bearing surface 31 of the second, third and fourth helical bearings 43, 44 and 45 is on the lens element 10, but it could alternatively be on the support structure 2.

Each of the second, third and fourth helical bearings 43, 44 and 45 may comprise a single rolling bearing element 33 while the first helical bearing 42 comprises two rolling bearing elements. This is possible because the constraints imposed by four helical bearings 42 to 45 are sufficient to constrain the movement of the lens element 10 with respect to the support structure 2 in degrees of freedom other than the helical movement.

Figure 7:
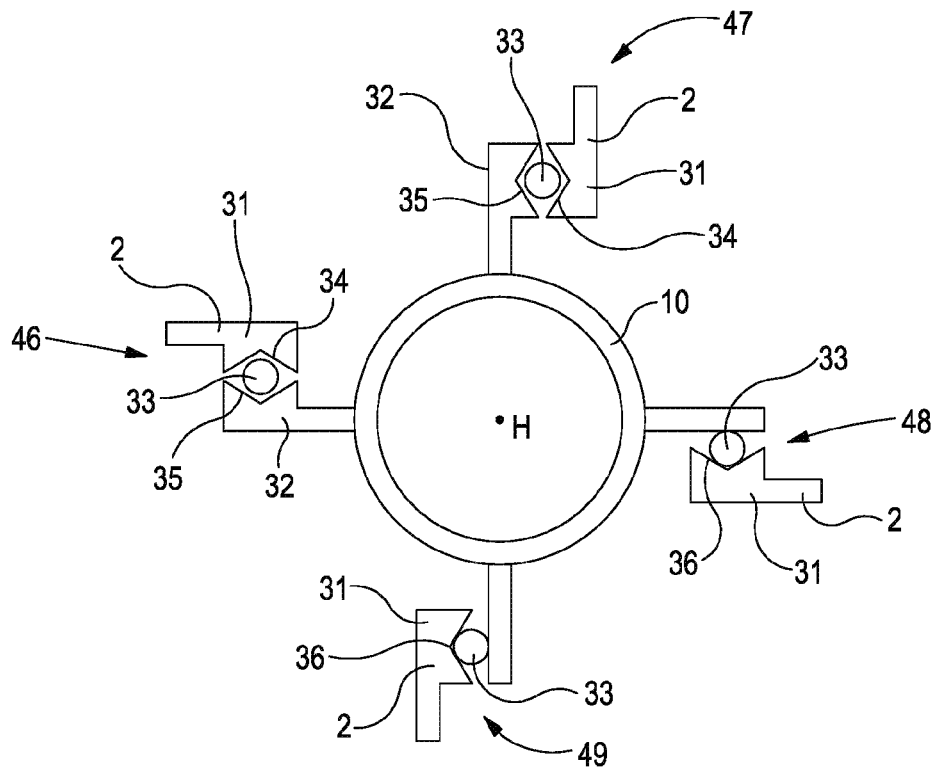

FIG. 7 illustrates another possible helical bearing arrangement that includes four helical bearings 46 to 49 only. The four helical bearings 46 to 49 are equally angularly spaced around the helical axis H, but they could alternatively be spaced unequally.

The first and second helical bearings 46 and 47 are of the same type as the helical bearing 30 shown in FIG. 2 wherein the bearing surfaces 31 and 32 each comprise respective grooves 34 and 35.

The third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 7 illustrates the case that the first bearing surface 31 of the third and fourth helical bearings 48 and 49 is on the lens element 10, but it could alternatively be on the support structure 2.

Each of the four helical bearings 46 to 49 may comprise a single rolling bearing element 33. This is possible because the constraints imposed by four helical bearings 46 to 49 are sufficient to constrain the movement of the lens element 10 with respect to the support structure 2 in degrees of freedom other than the helical movement. As a result of using only a single rolling bearing element 33 in each of the four helical bearings 46 to 49, the overall size of the four helical bearings 46 to 49, and in particular the height of the four helical bearings 46 to 49 projected along the helical axis H is reduced compared to the helical bearing arrangement of FIG. 4.

In each of the helical bearing arrangements of FIGS. 4 to 7, the bearing surfaces 32 which are on the lens element 10 are each arranged on the same side of (all above or all below) the bearing surfaces 31 on the support structure 2. As the bearing surfaces 31 and 32 extend helically, this means that in the view of FIG. 5 which is a cross-section perpendicular to the helical axis H, all the bearing surfaces 32 which are on the lens element 10 are on the right of the bearing surfaces 31 on the support structure 2 as viewed outwardly of the helical axis H, and in the view of FIGS. 6 and 7 all the bearing surfaces 32 which are on the lens element 10 are on the left of the bearing surfaces 31 on the support structure 2 as viewed outwardly of the helical axis H. As a result of this arrangement, the helical bearings all the bearing surfaces 31 on the support structure 2 face in the same direction as each other, which assists in manufacture of the bearing surfaces 31 by the same tool. Similarly, manufacturing advantages apply to the bearing surfaces 32 on the lens element 2 which also face in the same direction as each other.

As a result of this arrangement, all the helical bearings 30 need to be loaded in the same helical sense. Thus loading of the helical bearings 30 may be provided by applying a loading force along the helical axis H, a loading force around the helical axis H, or a combination thereof. In the arrangements described in more detail below, this loading force may be applied by the resilient biasing element 70 which resiliently biases the at least one SMA actuator wire 60.

Figure 8:
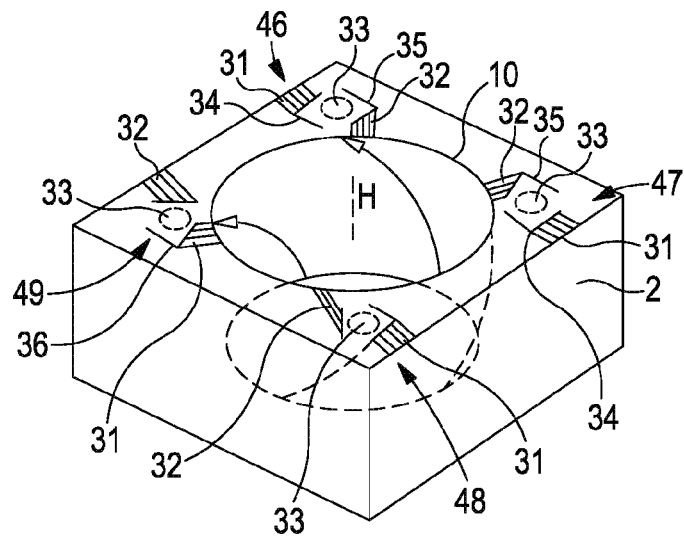
FIG. 8 is a perspective view of the SMA actuation apparatus with another possible helical bearing arrangement.

FIG. 8 illustrates another possible helical bearing arrangement that is a modification of the helical bearing arrangement of FIG. 7. Thus, the helical bearing arrangement includes four helical bearings 46 to 49 only, and the four helical bearings 46 to 49 are equally angularly spaced around the helical axis H, but they could alternatively be spaced unequally.

As in the helical bearing arrangement of FIG. 7, (a) the first and second helical bearings 46 and 47 are of the same type as the helical bearing 30 shown in FIG. 2 wherein the bearing surfaces 31 and 32 each comprise respective grooves 34 and 35, and (b) the third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 8 illustrates the case that the first bearing surface 31 of the third and fourth helical bearings 48 and 49 is on the lens element 10, but it could alternatively be on the support structure 2.

As in the helical bearing arrangement of FIG. 7, each of the four helical bearings 46 to 49 may comprise a single rolling bearing element 33. This is possible because the constraints imposed by four helical bearings 46 to 49 are sufficient to constrain the movement of the lens element 10 with respect to the support structure 2 in degrees of freedom other than the helical movement. As a result of using only a single rolling bearing element 33 in each of the four helical bearings 46 to 49, the overall size of the four helical bearings 46 to 49, and in particular the height of the four helical bearings 46 to 49 projected along the optical axis is reduced when each of the helical bearings has a single rolling element only.

However, the helical bearing arrangement of FIG. 8 is modified compared to that of FIG. 7 to change the arrangement of the bearing surfaces 31 and 32 in the individual bearings 46 to 49, as follows. In the first helical bearing 46, the bearing surfaces 32 on the lens element 10 are above the bearing surfaces 31 on the support structure 2 as viewed along the helical axis H, whereas in the second helical bearing 47, the bearing surfaces 32 on the lens element 10 are below the bearing surfaces 31 on the support structure 2 as viewed along the helical axis H. Similarly, in the third helical bearing 48, the bearing surfaces 32 on the lens element 10 are above the bearing surfaces 31 on the support structure 2 as viewed along the helical axis H, whereas in the fourth helical bearing 49, the bearing surfaces 31 on the lens element 10 are below the bearing surfaces 32 on the support structure 2 as viewed along the helical axis H.

This may be understood on the following basis with reference to a constraint of the bearings in the vertical plane, parallel to the helical axis. The first and third helical bearings 46 and 48 constrain the lens element 10 from moving down, and the second and fourth helical bearings 47 and 49 constrain the lens element 10 from moving up, or rotating around an axis between first and third helical bearings 46 and 48.

As a result of this arrangement, the helical bearings 46 to 49 do not all need to be loaded in the same helical sense around the helical axis H. This facilitates the loading of the helical bearings 46 to 49. For example, this arrangement allows for loading by a resilient loading arrangement as will now be described, or by a couple provided by the SMA actuator wires 60 which will be described below.

Optionally, an etching may be used to create resilient loading of any of the bearing surfaces on the lens element 10, in which case this same etching can be used to create a common connection between support structure 2 and the lens element 10. The crimp portions 61 for the SMA actuator wire 60 (as described below) could be connected mechanically and electrically to the common connection and inserts, or etched additions, on the support structure 2, for example by laser welding.

Any of the types of helical bearing arrangement 20 may include a resilient loading arrangement that loads a bearing surface of at least one of the rolling bearings with respect to the support structure or the moveable element on which the bearing surface is provided, against the rolling bearing element. FIGS. 9 to 13 show some examples of resilient loading arrangements of this type.

Each of the examples of FIGS. 9 to 13 is applied to a rolling bearing 100 that comprises a first bearing surface 101, a second bearing surface 102 and a rolling bearing element 103 (for example a ball or a roller) disposed between the first and second bearing surfaces 101 and 102. The rolling bearing 100 may be applied as any one or more of the rolling bearings of the helical bearings in any SMA actuation apparatus 1 described herein. When so applied, the first bearing surface 101 is provided on one of the support structure 2 or the lens element 10, and the second bearing surface 102 is provided on the other of the support structure 2 or the lens element 10, either way around. In each case, the first bearing surface 101 is movable with respect to one of the support structure 2 or the lens element 10 on which it is provided. In contrast, the second bearing surface 102 is fixed with respect to the other of the support structure 2 or the lens element 10 on which it is provided.

Figure 9:
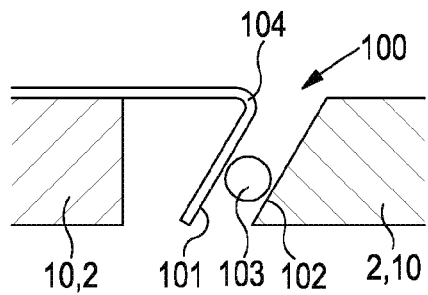
FIGS. 9 to 13 are side views of possible loading arrangements.

In the example of FIG. 9, the first bearing surface 101 is formed on a flexure element 104 that is connected to the lens element 10 or the support structure 2. The flexure element 104 is made of a resilient material, typically metal such as steel, and is connected to the adjacent part of the lens element 10 or the support structure 2. Thus, the flexure 104 is a resilient element which both allows the movement of the first bearing surface 101 with respect to the adjacent support structure 2 or lens element 10 and acts as a resilient loading arrangement that resiliently loads the first bearing surface 101 away from the adjacent part of the lens element 10 or the support structure 2, against the rolling bearing element 103.

Figure 10:
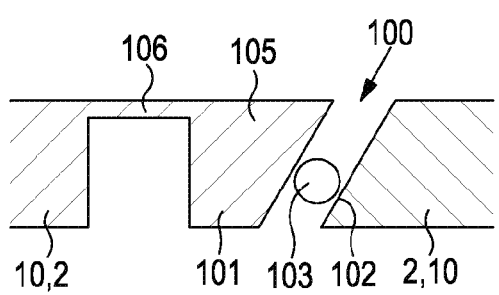

In the example of FIG. 10, the first bearing surface 101 is formed on a body 105. The body 105 is connected to the lens element 10 or the support structure 2 by a bridge portion 106 formed integrally with the body 105 and the adjacent part of the lens element 10 or the support structure 2 which allows the movement of the first bearing surface 101 with respect to the adjacent support structure 2 or lens element 10. The bridge portion 106 is configured as a resilient element arranged between the body 105 and the adjacent part of the lens element 10 or the support structure 2. Thus, the bridge portion 106 acts as a resilient loading arrangement that resiliently loads the body 106 and hence the first bearing surface 101 away from the adjacent part of the lens element 10 or the support structure 2, against the rolling bearing element 103.

Figure 11:
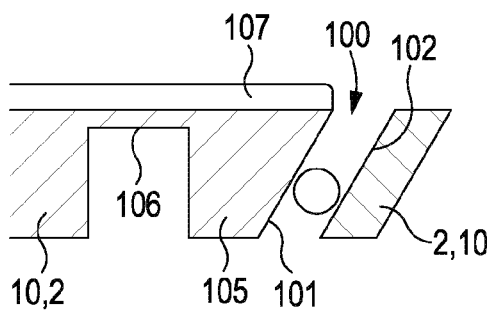

The example of FIG. 11 is the same as the example of FIG. 10, except that a flexure element 107 is connected to the bridge portion 106. In this case, the flexure element 107 and the bridge portion 106 together allow the movement of the first bearing surface 101 with respect to the adjacent support structure 2 or lens element 10, whereas the flexure element 107 is a resilient element which acts as a resilient loading arrangement that resiliently loads the body 106 and hence the first bearing surface 101 away from the adjacent part of the lens element 10 or the support structure 2, against the rolling bearing element 103. In contrast to the example of FIG. 10, the flexure element 107 may be designed to provide the dominant resilient effect. The bridge portion 106 may have resilience and thus contribute to the loading in combination with the flexure element 107, or may have substantially no resilience compared to the flexure element. As such, the bridge portion 106 may be relatively thin compared to the example of FIG. 10. Advantageously, this arrangement reduces the occurrence of stress relaxation.

Figure 12:
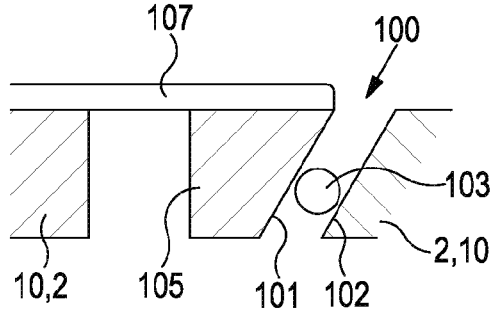

The example of FIG. 12 is the same as the example of FIG. 11, except that the bridge portion 106 is omitted, so that the body portion 105 is a separate element from the adjacent part of the lens element 10 or the support structure 2, and is connected thereto by the flexure element 107. As a result, the flexure element 107 alone is a resilient element which acts as a resilient loading arrangement that resiliently loads the body 105 and hence the first bearing surface 101 away from the adjacent part of the lens element 10 or the support structure 2, against the rolling bearing element 103.

Figure 13:
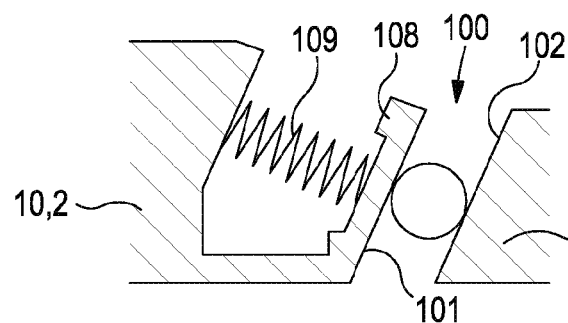

In the example of FIG. 13, the first bearing surface 101 is formed on a flexible arm 108 that is formed integrally with the adjacent part of the lens element 10 or the support structure 2. Thus, the flexible arm 108 allows the movement of the first bearing surface 101 with respect to the adjacent support structure 2 or lens element 10. In addition, a spring 109 (or other resilient element) is arranged between the arm 108 and the adjacent support structure 2 or lens element 10. The spring 109 is in compression. Thus, the spring 109 is a resilient element acts as a resilient loading arrangement that resiliently loads the first bearing surface 101 away from the adjacent part of the lens element 10 or the support structure 2, against the rolling bearing element 103.

Another alternative for the resilient loading arrangement is that one of the bearing surfaces on either the support structure 2 or lens element 10 is replaced by an etching, a thin walled section of the support structure 2 or lens element 10. Considering a thin wall or twist in either support structure 2 or lens element 10, these tolerance accommodations could be fixed for each assembly by using glue. In the case that SMA actuation apparatus 1 is a camera, the thin wall section or twist in the lens element 10 could be fixed into position when the lens is glued into position, or the thin wall section or twist in the chassis could be fixed into position when a screening can is glued into position. Such thin walls or twists could be made to dynamically accommodate variations in bearing surface, in the same way as the examples of FIGS. 9 to 13.

Figure 14:
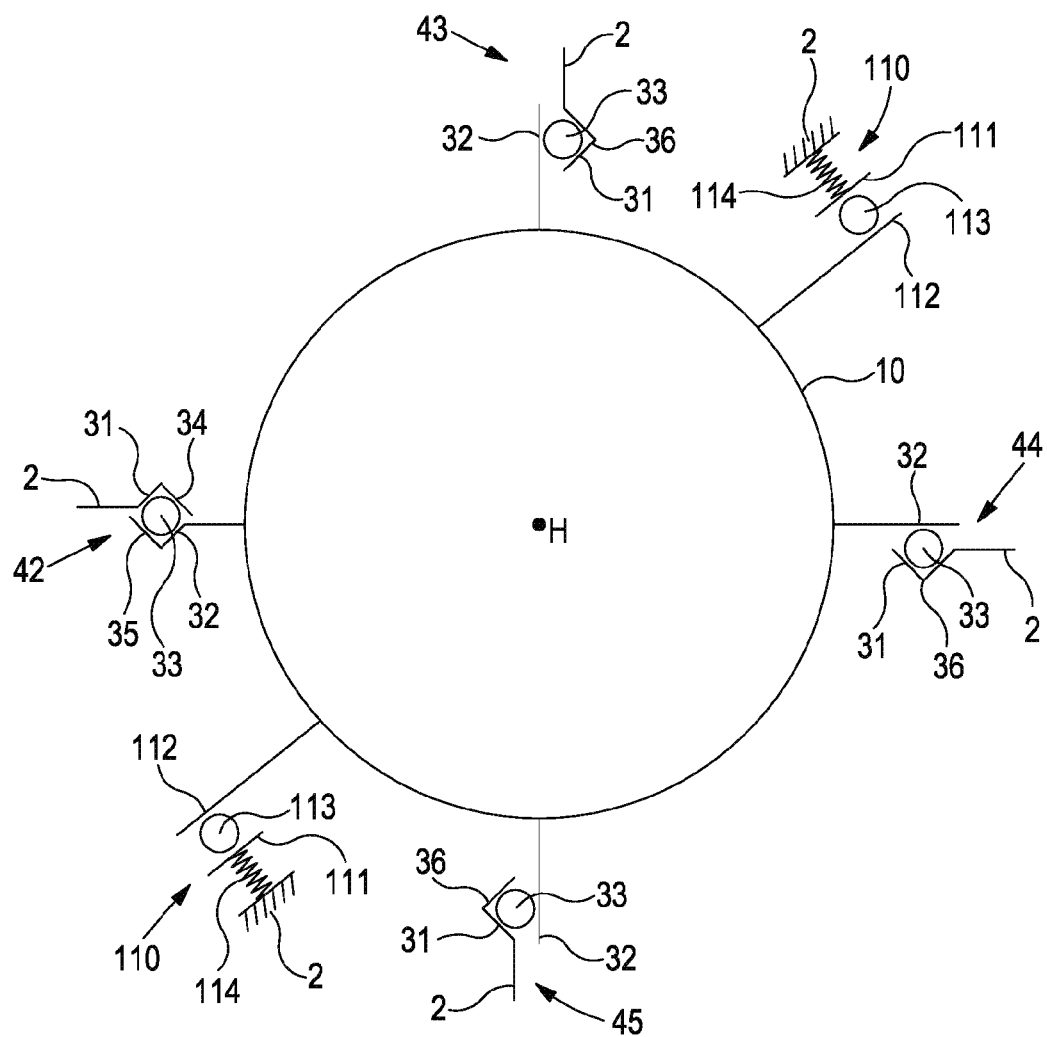
FIG. 14 is a schematic cross-sectional view of the SMA actuation apparatus with yet another possible helical bearing arrangement.

FIG. 14 shows an example of the SMA actuation apparatus 1 with a helical bearing arrangement which is similar to that of FIG. 6 but with some modifications as will now be described. The helical bearing arrangement includes four helical bearings 42 to 45 that are arranged in the same as in FIG. 6, as described above. The helical bearings 42 to 45 each include a single rolling bearing element 33, so that they provide a total of five constraints. The first helical bearing 42 is of the same type as the helical bearing 30 shown in FIG. 2, wherein the bearing surfaces 31 and 32 each comprise respective grooves 34 and 35. The second, third and fourth helical bearings 43, 44 and 45 are each of the same type as the helical bearing 30 shown in FIG. 3, wherein the first bearing surface 31 comprises a groove 36 in which the rolling bearing element 33 is seated and the second bearing surface 32 is planar. As in FIG. 6, the first bearing surface 31 of the second, third and fourth helical bearings 43, 44 and 45 is illustrated as being on the lens element 10, but it could alternatively be on the support structure 2.

The bearing surfaces 32 which are on the lens element 10 are each arranged on the same side of (all above or all below) the bearing surfaces 31 on the support structure 2. As the bearing surfaces 31 and 32 extend helically, this means that in the view of FIG. 14 which is a cross-section perpendicular to the helical axis H, all the bearing surfaces 32 which are on the lens element 10 are on the left of the bearing surfaces 31 on the support structure 2 as viewed outwardly of the helical axis H. As a result of this arrangement, all the helical bearings 42 to 46 need to be loaded in the same helical sense, corresponding to a clockwise rotation of the lens element 2 in FIG. 14.

To provide such loading, the helical bearing arrangement is modified compared to FIG. 6 to include two additional rolling bearings 110 that are helical bearings arranged as follows. The rolling bearings 110 comprise a first bearing surface 111, a second bearing surface 112 and a rolling bearing element 113 (for example a ball or a roller) disposed between the first and second bearing surfaces 111 and 112. The first bearing surface 111 is movable with respect to the support structure 2 and a resilient element 114 is arranged between the first bearing surface 111 and the support structure 2. The resilient element 114 loads the first bearing surface 111 away from the support structure 2, thereby acting as a resilient loading arrangement that resiliently loads the first bearing surface 111 against the rolling bearing element 113. As an alternative, the rolling bearing element 110 could be reversed so that the second bearing surface 112 is movable with respect to the lens element 10 and the resilient element 114 loads the second bearing surface 112 against the rolling bearing element 113. The additional rolling bearings 110 may have any suitable construction, including the construction of the rolling bearing 110 in any of the examples of FIGS. 9 to 13.

The additional rolling bearings 110 are arranged the opposite way around relative to the helical bearings 42 to 46 so that they load the helical bearings 42 to 46 in the same helical sense, corresponding to a clockwise rotation of the lens element 2 in FIG. 14. As a result, the helical bearing arrangement shown in FIG. 14 is highly balanced and the tolerances are reduced, which assists manufacture. Similarly to the helical bearing arrangement of FIG. 6, manufacture of the helical bearings 42 to 46 is assisted by all the bearing surfaces 31 on the support structure 2 facing in the same direction as each other, and all the bearing surfaces 32 on the lens element 10 facing in the same direction as each other.

Two additional rolling bearings 110 are shown here, arranged on opposite sides of the lens element 2. More generally, any number of one or more additional rolling bearings 110 may be provided, but plural additional rolling bearings 110 spaced around the lens element 2 are advantageous to assist balancing of forces.

In the above examples, the helical bearings 30 are rolling bearings, but each case the helical bearings 30 may be replaced by a sliding bearing, two examples of which are shown in FIGS. 15 to 18.

Figure 15:
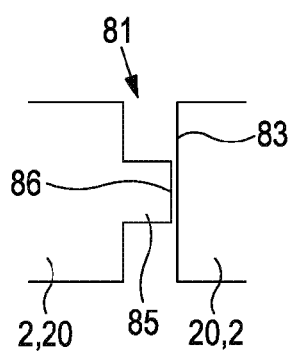
FIG. 15 is a cross-sectional view of a first alternative bearing, the cross-section being taken perpendicular to the direction of movement of the bearing.
Figure 16:
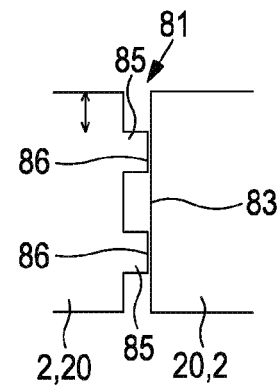
FIG. 16 is a side view of the first alternative bearing of FIG. 15.

In the first example shown in FIGS. 15 and 16, the plain bearing 81 comprises an elongate bearing surface 83 on one of the support structure 2 and the lens element 10. The plain bearing 81 also comprises protrusions 85 formed on the other of the support structure 2 and lens element 10, the ends of the protrusions 85 forming bearing surfaces 86 which bear on the elongate bearing surface 83. Although two protrusions 85 are shown in this example, in general any number of one or more protrusions 85 may be provided. The elongate bearing surface 83 and the bearing surfaces 86 are conformal, both being planar in this example, so as to permit relative movement of the lens element 10 with respect to the support structure 2. The elongate bearing surface 83 and the bearing surfaces 86 desirably have a coefficient of friction of 0.2 or less.

Figure 17:
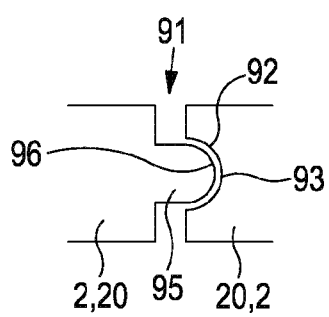
FIG. 17 is a cross-sectional view of a second alternative bearing, the cross-section being taken perpendicular to the direction of movement of the bearing.
Figure 18:
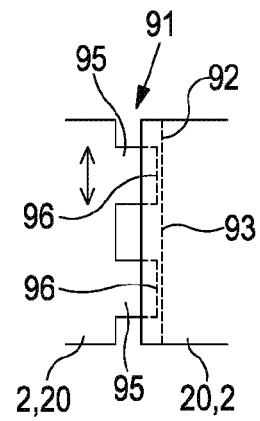
FIG. 18 is a side view of the alternative bearing of FIG. 17.

In the second example shown in FIGS. 17 and 18, the plain bearing 91 comprises a channel 92 on one of the support structure 2 and the lens element 10, the inner surface of the channel 92 forming a bearing surface 93. The plain bearing 91 comprises protrusions 95 formed on the other of the support structure 2 and lens element 10, the ends of the protrusions 95 forming bearing surfaces 96 which bear on the bearing surface 93. Although two protrusions 95 are shown in this example, in general any number of one or more protrusions 95 may be provided. The elongate bearing surface 93 and the bearing surfaces 96 are conformal, both being planar in this example, so as to permit relative movement of the lens element 10 with respect to the support structure 2. The elongate bearing surface 93 and the bearing surfaces 96 desirably have a coefficient of friction of 0.2 or less.

In each of the plain bearings 81 and 91, the materials of the bearing surfaces 83, 86, 93, 96 are chosen to provide smooth movement and a long life. The bearing surfaces 83, 86, 93, 96 may be unitary with the underlying component or may be formed by a surface coating. Suitable materials include, for example PTFE or other polymeric bearing materials, or metal.

In each of the plain bearings 81 and 91, a lubricant may be provided on the bearing surfaces 83, 86, 93, 96. Such a lubricant may be a powder or a fluid, for example. Suitable lubricants include: graphite; silicon paste or a low viscosity oil.

Figure 19:
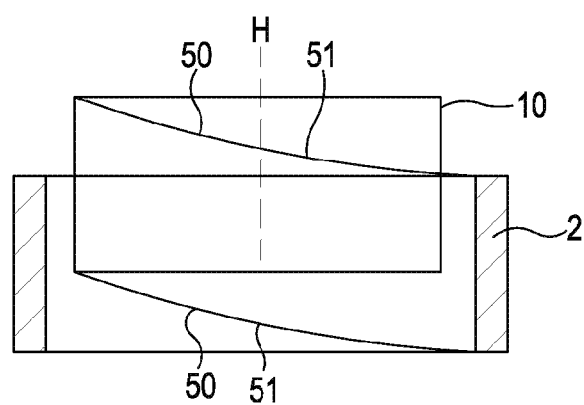
FIG. 19 is a side view of the SMA actuation apparatus with a helical bearing arrangement comprising plural flexures.
Figure 20:
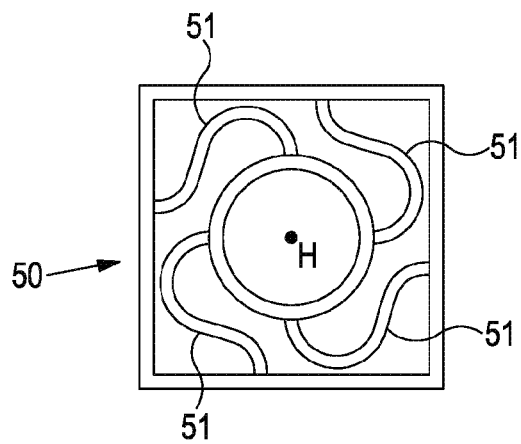
FIGS. 20 and 21 are plan views of the helical bearing arrangement of FIG. 19 with different forms of flexures.
Figure 21:
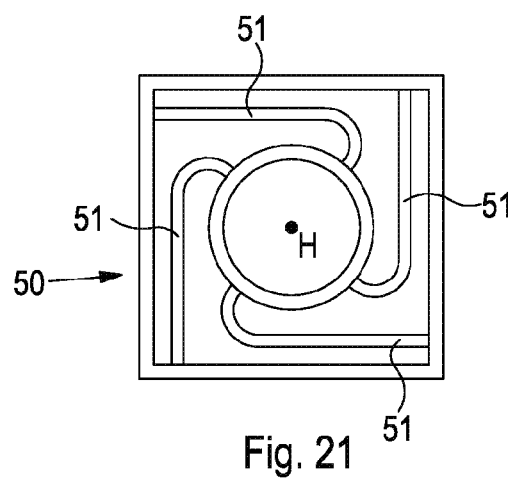

While the helical bearing arrangement 20 comprises helical bearings 30 that are rolling bearings in the above example, another possibility is that the helical bearing arrangement 20 comprises at least one flexure extending between the support structure 2 and the lens element 10 as shown for example in FIG. 19 wherein the helical bearing arrangement 20 comprises two flexure elements 50 that each comprise four flexures 51 having a configuration as shown either in FIG. 20 or in FIG. 21. As shown in FIG. 19, the flexures 51 are each pre-deflected along the helical axis H, and as shown in FIGS. 20 and 21, the flexures 51 each extend in an arc around the helical axis H. As a result of this configuration, the flexures 51 guide the helical movement of the lens element 10 with respect to the support structure 2 around the helical axis H. The specific number and arrangement of flexures 51 in FIGS. 19 to 21 is not essential and other configurations of flexures that are pre-deflected along the helical axis H and extend in an arc around the helical axis H may be used to provide the same function.

Figure 22:
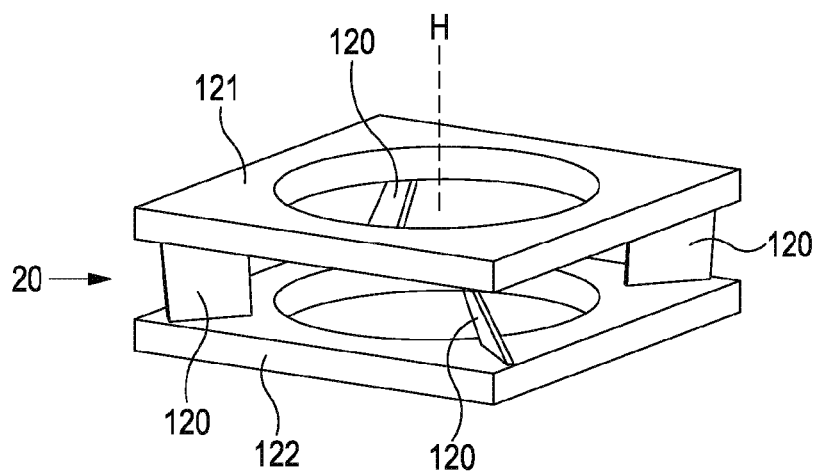
FIG. 22 is a perspective view of an alternative helical bearing arrangement comprising plural flexures.

FIG. 22 is a perspective view of an alternative helical bearing arrangement 20 comprising plural flexures 120, four flexures 120 being shown in FIG. 22 although in general any number of flexures 120 could be provided. In this example, the helical bearing arrangement also comprises a movable plate 121 mounted on lens element 10 and a support plate 122 mounted on the support structure 2. The movable plate 121 and the support plate 122 are spaced along the helical axis H and the flexures 120 extend along the helical axis H and are inclined with respect to a plane normal to the helical axis H helical axis with rotational symmetry around the helical axis H. With this arrangement, the flexures 120 guide the helical movement of the lens element 10 with respect to the support structure 2 around the helical axis H.

The flexures 120 are integrally formed with the movable plate 120 and the support plate 122. This form of connection is advantageous because it allows the helical bearing arrangement to be made as a single part, for example in a moulding, providing exact constraints. This solution therefore combines precision with a low manufacturing cost. That said, in principle the flexures 120 could be separate elements connected to the lens element 10 and the support structure 2 in any suitable way.

The use of SMA actuator wires to rotate the lens element 10 will now be described.

Figure 23:
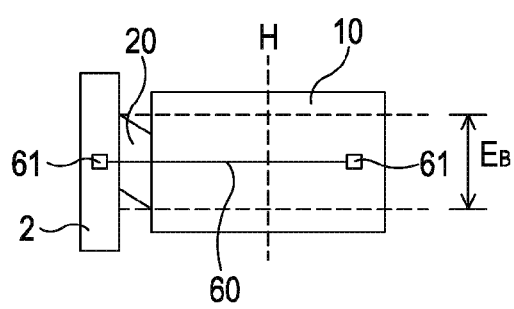
FIGS. 23 and 24 are schematic side views of the SMA actuator apparatus including an SMA actuator wire extending at two different angles.
Figure 24:
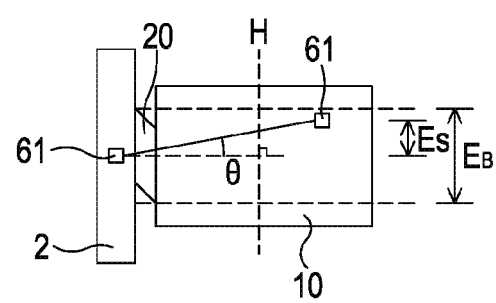

The SMA actuation apparatus 1 includes at least one SMA actuator wire 60 for the purpose of rotating the lens element 10. The or each SMA actuator wire 60 is connected between the support structure 2 and the lens element 10, for example as shown in FIGS. 23 and 24. The SMA actuator wire 60 is connected to the support structure 2 and lens element 10 by crimp portions 61 which crimp the SMA actuator wire 60 to provide both mechanical and electrical connection. In the case of FIG. 23, the SMA actuator wire 60 extends in a plane normal to the helical axis H. In the case of FIG. 24, the SMA actuator wire 60 extends at an acute angle θ to a plane normal the helical axis H. The SMA actuator wire 60 is offset from the helical axis. Thus, in both the case FIG. 23 and FIG. 24, contraction of the SMA actuator wire 60 drives rotation of the lens element 10 around the helical axis H. Accordingly, either of the orientations of the SMA actuator wire 60 of FIG. 23 or FIG. 24 may be used in any of the arrangements described below.

As the helical bearing arrangement 20 guides helical movement of the lens element 10 with respect to the support structure 2 and constrains movement in other degrees of freedom, the rotation driven by contraction of the SMA actuator wire 60 is converted by the helical bearing arrangement 20 into helical movement of the lens element 10 with respect to the support structure 2. Thus, as well as the component of rotational movement, a component of translational movement of the lens element 10 with respect to the support structure 2 is achieved along the helical axis H. This changes the focus of the image on the image sensor 3 as described above.

As the SMA actuator wire 60 has the primary purpose of driving rotation of the lens element 10, the extent of the SMA actuator wire projected along the helical axis H may be minimised. As such, other components of the SMA actuation apparatus 1 constrain the reduction in size along the helical axis H. Typically, the height projected along the helical axis H becomes dependent on the helical bearing arrangement 20, for example the helical bearing arrangement, which is illustrated schematically in FIGS. 23 and 24.

In the case of FIG. 23, as the SMA actuator wire 60 extends in a plane normal to the helical axis H, the SMA actuator wire 60 has a minimum extent projected along the helical axis H being essentially the thickness of the SMA actuator wire 60, which is clearly less than the extent $E_B$ of the helical bearing arrangement 20 projected along the helical axis H. However, the SMA actuator wire 60 is angled with respect to the flexures to allow the desired movement. Thus in FIG. 23 the flexures of the helical bearing arrangement need to be at an angle to the SMA actuator wire 60.

In the case of FIG. 24, as the SMA actuator wire 60 extends at an acute angle to a plane normal to the helical axis H, the SMA actuator wire 60 has a greater extent $E_S$ projected along the helical axis H than in the case of FIG. 23, but this extent $E_S$ may be controlled by adjusting the acute angle to fit within any desired size constraint, typically being selected to be less than the extent $E_B$ of the helical bearing arrangement 20 projected along the helical axis H.

Various different arrangements of the at least one SMA actuator wire 60 may be used in the SMA actuation apparatus 1, provided that the at least one SMA actuator wire 60 drives rotation of the lens element 10 with respect to the support structure 2. Some examples of possible arrangements of the at least one SMA actuator wire 60 are as follows with reference to FIGS. 25 to 30 which are each schematic drawings of the SMA actuation apparatus 1 including schematically illustrated connection portions 65 that are part of the lens element 10 and to which the SMA actuator wire 60 is connected. In each case, the or each SMA actuator wire 60 is connected between the support structure 2 and the lens element 10 in the respective orientations shown.

Figure 25:
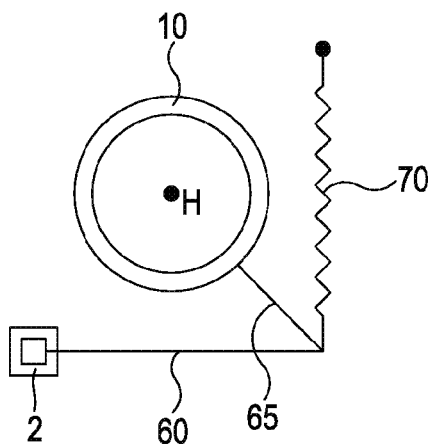
FIGS. 25 to 27 are schematic plan views of the SMA actuator apparatus with different arrangements of SMA actuator wire and a resilient biasing element.

In a first type of embodiment, the SMA actuation apparatus 1 further comprises a resilient biasing element 70 connected between the support structure 2 and the lens element 10, as in FIG. 25. The resilient biasing element 70 is typically a spring, as in the examples below, but in principle could be formed by any other element for example being a flexure or a piece of resilient material.

Such a resilient biasing element 70 is arranged to resiliently bias the at least one SMA actuator wire 60. In general terms, use of a resilient biasing element 70 with an SMA actuator wire is known, the resilient biasing element 70 applying a stress to the SMA actuator wire 60 and driving movement in the opposite direction from contraction of the SMA actuator wire 60. Thus, such a resilient biasing element 70 may be employed with a single SMA actuator wire 60 or plural SMA actuator wires 60. In the specific case of the SMA actuation 1, the resilient biasing element 70 may be arranged in various ways, some examples of which are as follows.

FIG. 25 shows an example where the SMA actuation apparatus 1 comprises a single SMA actuator wire 60 only and the resilient biasing element 70 extends around the helical axis H and so provides a force around the helical axis H. In FIG. 25, the resilient biasing element operates in tension, but alternatively could operate in compression, for example being arranged alongside the SMA actuator wire 60. The use of a resilient biasing element 70 extends around the helical axis H minimises the extent of the resilient biasing element 70 projected along the helical axis H.

Figure 26:
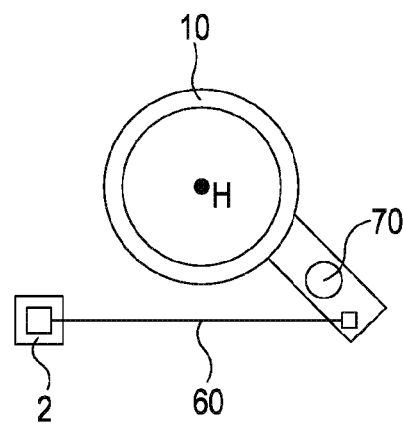

FIG. 26 shows an example where the SMA actuation apparatus 1 comprises a single SMA actuator wire 60 only and the resilient biasing element 70 extends parallel to the helical axis H and so provides a force along the helical axis H. In this case, the forces applied by the resilient biasing element 70 acts in a different direction from the SMA actuator wire 60, but resilient biasing is still provided due to the effect of the helical bearing arrangement 20. In FIG. 26, a helical spring is the resilient biasing element 70, shown with its axis parallel to the optic axis. The spring axis could alternatively be at an angle to the optic axis, as depicted and described further below and in FIGS. 38, 39 and 40.

The examples shown in FIGS. 25 and 26 include a single SMA actuator wire 60, but may be modified to include plural SMA actuator wires 60 acting in parallel.

Figure 27:
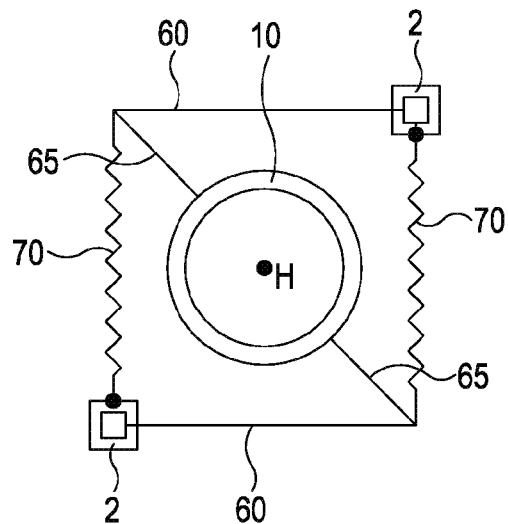

FIG. 27 shows an example of this which corresponds to the example of FIG. 25 but with the SMA actuator wire 60 and the resilient biasing element 70 being duplicated on opposite sides of the lens element 10. The SMA actuator wires 60 and the resilient biasing elements 70 have rotational symmetry around the helical axis, and so the SMA actuator wires 60 are complimentary and drive rotation of the lens element 10 with respect to the support structure 2 in parallel, that is in the same sense around the helical axis H, and so are actuated together. However, as the SMA actuator wires 60 are arranged on opposite sides of the helical axis H, the SMA actuator wires 60 also provide translational forces on the lens element 10 in opposite directions in a plane normal to the helical axis H (left and right in FIG. 27. Thus, the net translational force applied by the SMA actuator wires 60 is minimised, thereby reducing the force applied to the helical bearing arrangement 20.

In a second type of embodiment, no resilient biasing element is provided, and instead the SMA actuation apparatus 1 comprises at least one pair of SMA actuator wires 60 that are arranged to drive rotation of the lens element 10 in opposite senses around the helical axis H. Similar to known uses of opposed SMA actuator wires to provide opposed forces in translation of an object that moves linearly, the or each pair of SMA actuator wires 60 apply opposed torques around the helical axis H. Thus, the SMA actuator wires 60 of the pair apply a stress to each other, which may act through the helical bearing arrangement 20, and drive rotation of the lens element 10 in the opposite directions around the helical axis H.

In the case of the SMA actuation 1, the at least one pair of SMA actuator wires 60 may be arranged in various ways, some examples of which are as follows.

Figure 28:
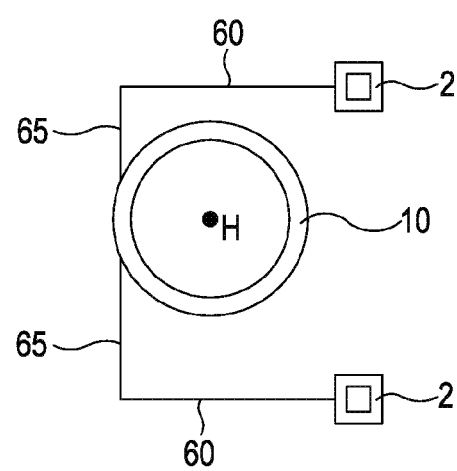
FIGS. 28 to 30 are schematic plan views of the SMA actuator apparatus with different arrangements of SMA actuator wire that are opposed in rotation.

FIG. 28 shows an example where the SMA actuation apparatus 1 comprises a pair of SMA actuator wires 60 are arranged on opposite sides of the helical axis H. As a result, the pair of SMA actuator wires 60 apply lateral forces to the lens element 10 in a plane normal to the helical axis in parallel directions (that is from left to right in FIG. 28). In this case, the combined lateral force is resisted by the helical bearing arrangement 20. This is advantageous for the type of the helical bearing arrangement 20 that needs to be loaded, as may be the case when the helical bearings 30 are used, as in the example in FIG. 4.

Figure 29:
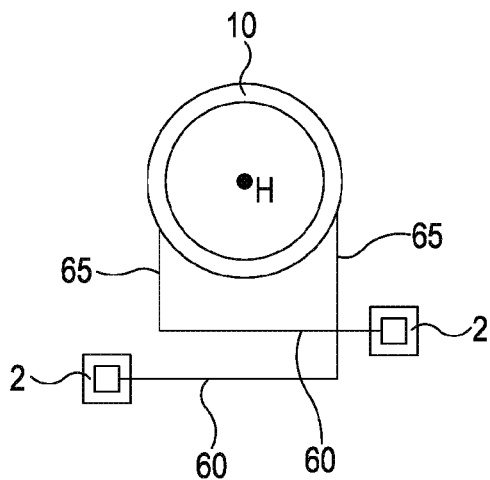

FIG. 29 shows an example where the SMA actuation apparatus 1 comprises a pair of SMA actuator wires 60 are arranged on the same side of the helical axis H. Although FIG. 29 shows the SMA actuator wires 60 as being alongside each other as viewed along the helical axis H, the SMA actuator wires 60 may alternatively overlie each other to reduce the footprint of the SMA actuation apparatus 1. As a result, the SMA actuator wires 60 apply lateral forces to the lens element 10 in a plane normal to the helical axis H in opposite directions (that is, in FIG. 29, one SMA actuator wire 60 applying a force from left to right and the other SMA actuator wire 60 applying a force from right to left). Thus, the net translational force applied by the SMA actuator wires 60 to the helical bearing arrangement 20 is minimised, thereby reducing the force applied to the helical bearing arrangement 20. This may be advantageous for types of helical bearing arrangement 20 where loading is disadvantageous, as may be the case when flexures 51 are used, as in the example in FIG. 19.

Figure 30:
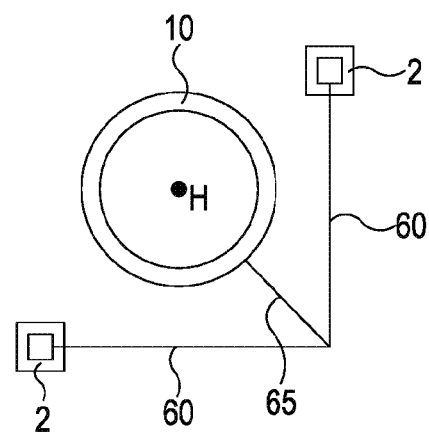

FIG. 30 shows an example where the SMA actuation apparatus 1 comprises a pair of SMA actuator wires 60 on two adjacent sides of the lens element 10 and having an angle therebetween of 90 degrees. More generally the orientation of the SMA actuator wires 60 may be changed so that the angle therebetween has any size less than 180 degrees, but preferably the angle is in the range from 70 to 110 degrees as viewed along the helical axis H. In this case, the net translational force applied by the SMA actuator wires 60 to the helical bearing arrangement 20 is reduced compared to the example of FIG. 28. The reduction is by a factor of $\sqrt{2}$ in the example of FIG. 30 but this factor may be controlled by selection of the angle between the SMA actuator wires. This type of configuration is useful for controlling the loading applied to the helical bearing arrangement 20. This is advantageous for type of the helical bearing arrangement 20 that need to be loaded, as may be the case when the helical bearings 30 are used, as in the example in FIG. 45.

In general terms, any of the forms of the helical bearing arrangement 20 described herein, including any helical bearing arrangement or the flexure arrangement, may be used with any of the arrangements of at least one SMA actuator wire 60 described herein.

By way of non-limitative example, FIGS. 31 to 38 illustrate some different examples of the SMA actuation apparatus 1 employing specific forms of the helical bearing arrangement 20 and specific configurations for the at least one SMA actuator wire 60, as follows. In each of FIGS. 31 to 38, the support structure 2 and the lens element 10 are formed by moulded components.

Figure 31:
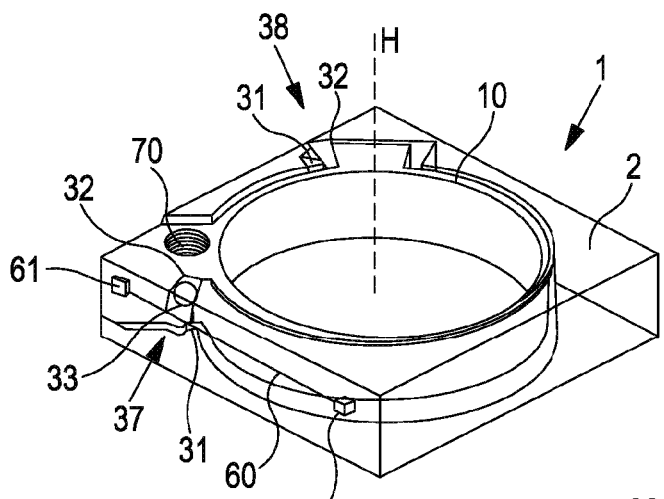
FIGS. 31 and 32 are perspective views of a further example of the SMA actuator apparatus.
Figure 32:
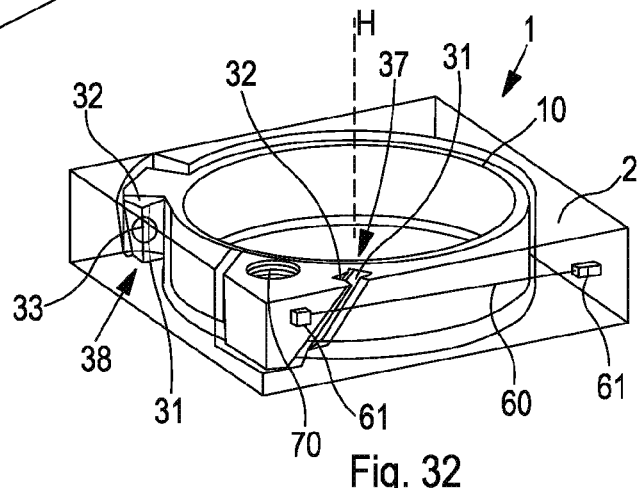
Figure 33:
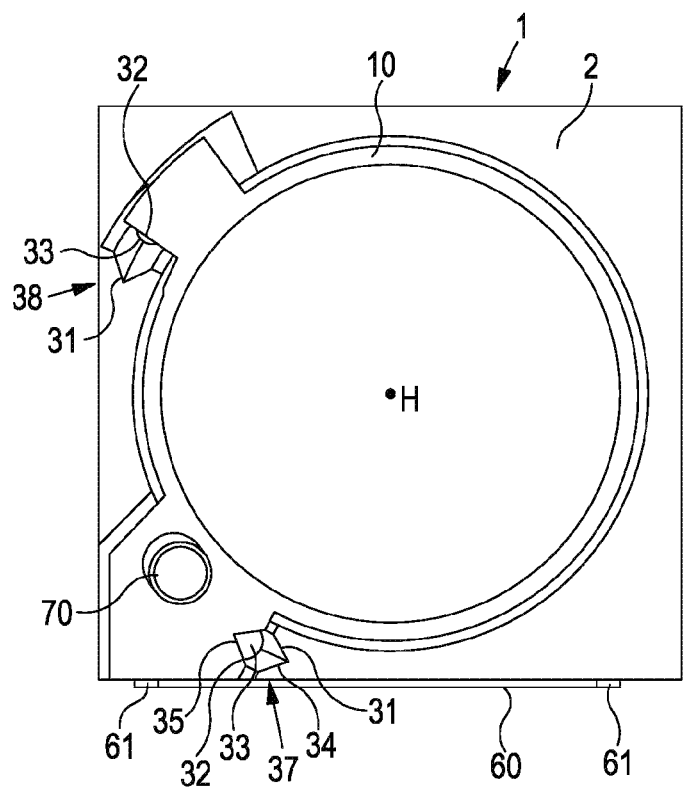
FIG. 33 is a plan view of the SMA actuator apparatus shown in FIGS. 31 and 32.

In the example of FIGS. 31 to 33, the helical bearing arrangement 20 comprises two helical bearings 37 and 38 with an arrangement of the type shown in FIG. 4 and described above. That is, the first helical bearing 37 comprises bearing surfaces 31 and 32 each comprising respective grooves 34 and 35, with plural rolling bearing elements 33, and the second helical bearing 38 comprises a first bearing surface 31 comprising a groove 36 and a second bearing surface 32 that is planar, with a single rolling bearing element 33.

Also, in the example of FIGS. 31 to 33, the SMA actuation apparatus 1 comprises a single SMA actuator wire 60 only and a resilient biasing element 70 providing a resilient biasing force having an arrangement of the type shown in FIG. 26. That is, the resilient biasing element 70 extends parallel to the helical axis H and so provides a force along the helical axis H. The SMA actuator wire 60 extends at a slight angle with respect to the normal to the helical axis.

Figure 34:
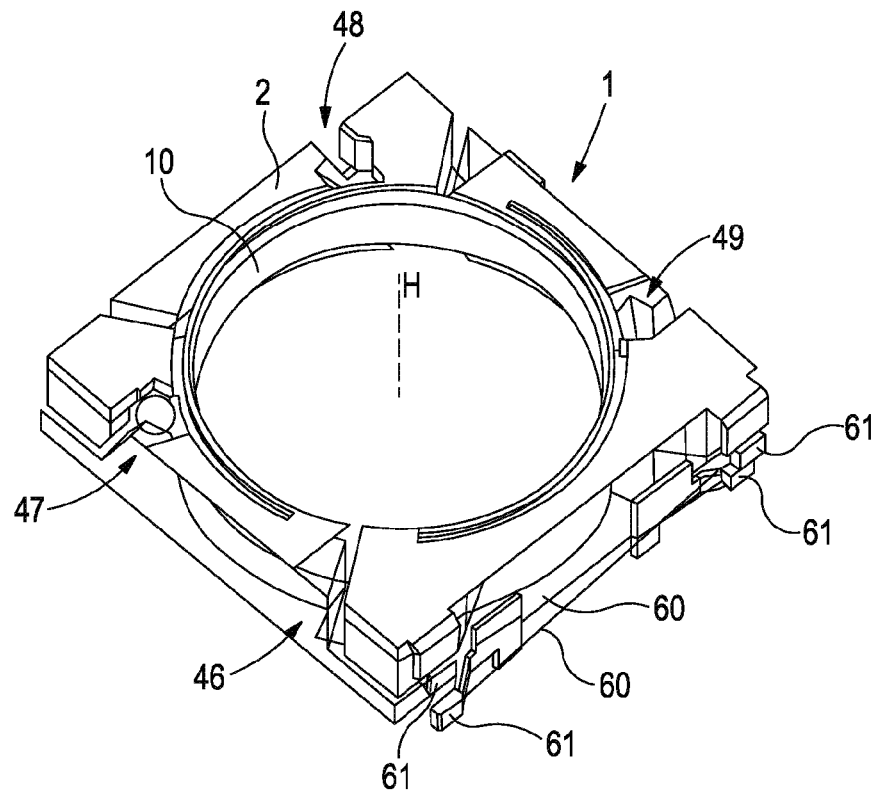
FIG. 34 is a perspective views of a yet further example of the SMA actuator apparatus.
Figure 35:
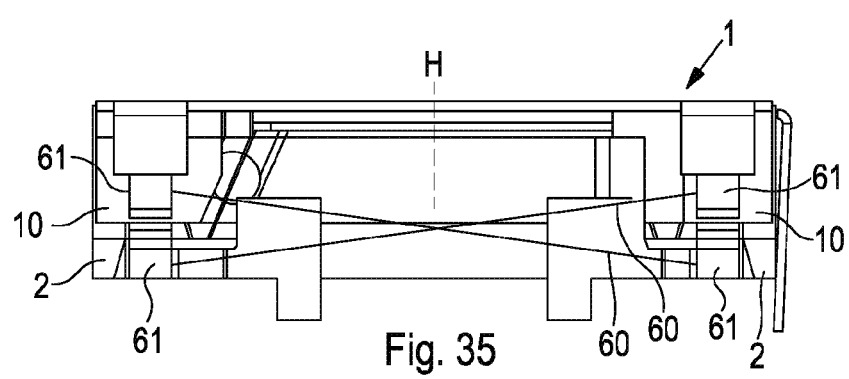
FIG. 35 is a side view of the SMA actuator apparatus shown in FIG. 34.
Figure 36:
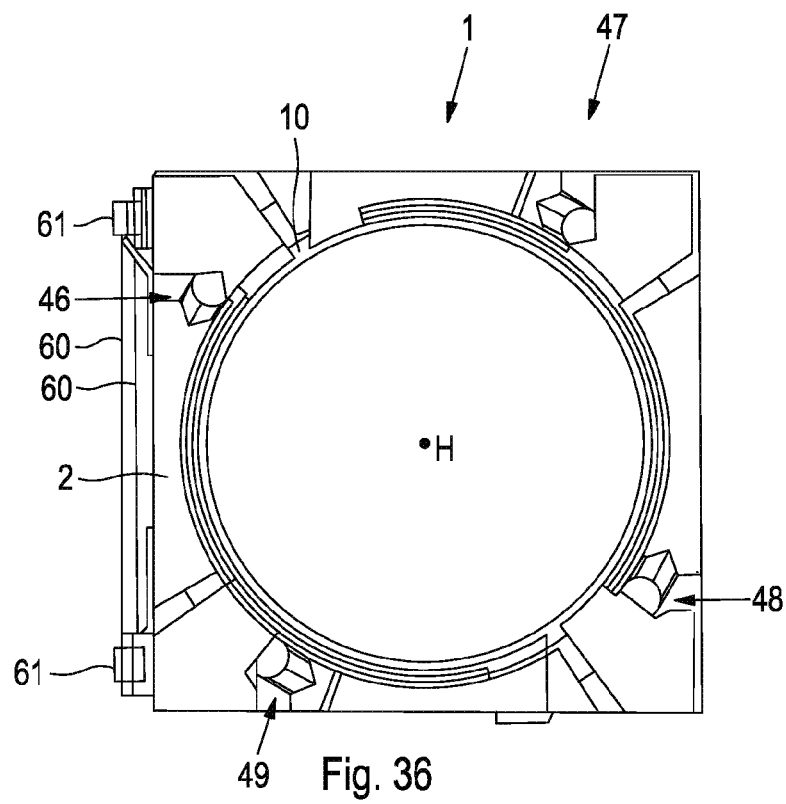
FIG. 36 is a plan view of the SMA actuator apparatus shown in FIG. 34.

In the example of FIGS. 34 to 36, the helical bearing arrangement 20 comprises four helical bearings 46 to 49 with an arrangement of the type shown in FIG. 7 and described above. The arrangement of the four helical bearings 46 to 49 is shown in greater detail in FIG. 37. That is, the first and second helical bearings 46 and 47 comprise bearing surfaces 31 and 32 each comprising respective grooves 34 and 35, with a single rolling bearing element 33, and the third and fourth helical bearings 48 and 49 comprise a first bearing surface 31 comprising a groove 36 and a second bearing surface 32 that is planar, with a single rolling bearing element 33. The particular arrangement of the bearings is shown in more detail in FIG. 42.

Also, in the example of FIGS. 34 to 36, the SMA actuation apparatus 1 comprises pair of SMA actuator wires 60 having an arrangement of the type shown in FIG. 28. That is, SMA actuator wires 60 are arranged on the same side of the helical axis H but, on contraction, drive rotation of the lens element 10 in opposite senses around the helical axis H. The SMA actuator wire 60 extends at an angle with respect to a plane normal to the helical axis H.

Figure 37:
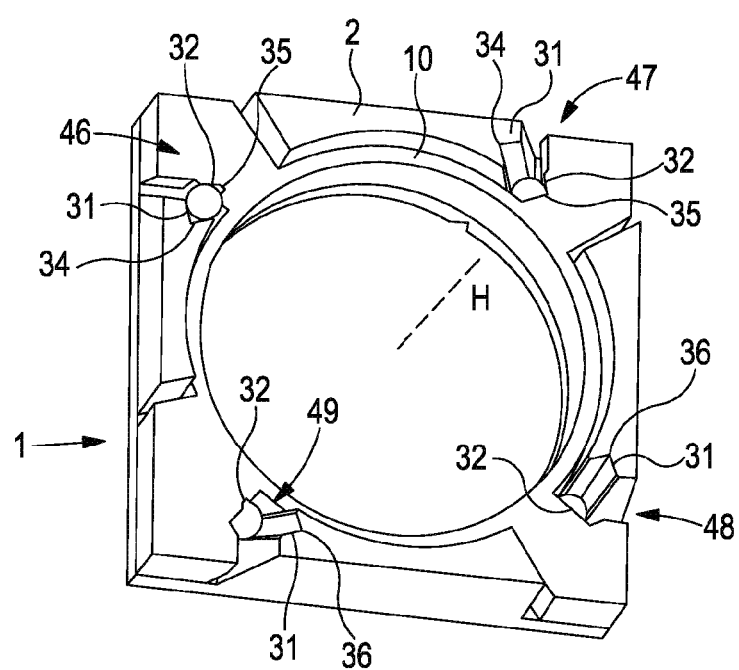
FIG. 37 is a perspective view of the helical bearing arrangement of the SMA actuator apparatus shown in FIG. 34.
Figure 38:
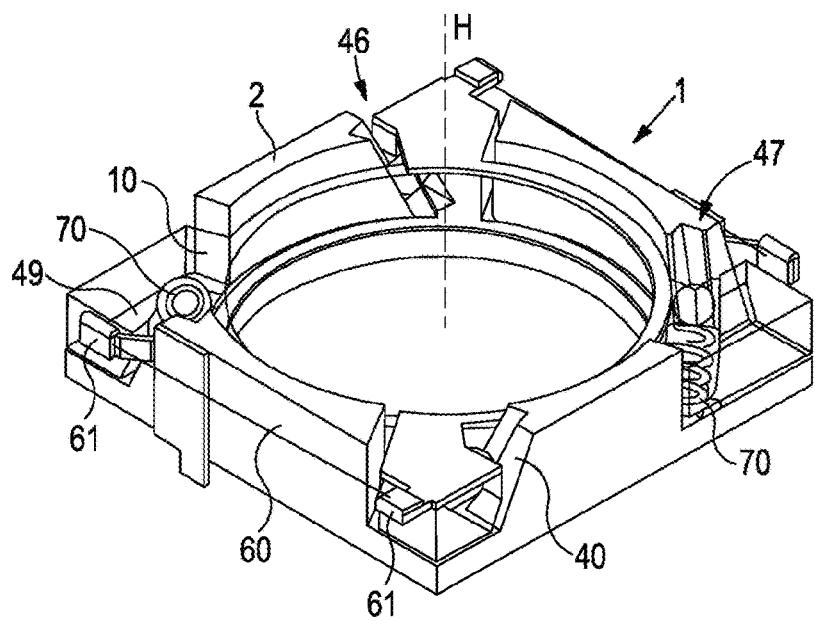
FIG. 38 is a perspective views of a yet further example of the SMA actuator apparatus.
Figure 39:
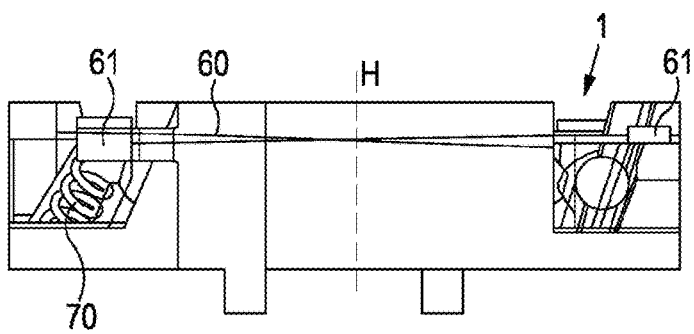
FIG. 39 is a side view of the SMA actuator apparatus shown in FIG. 38.
Figure 40:
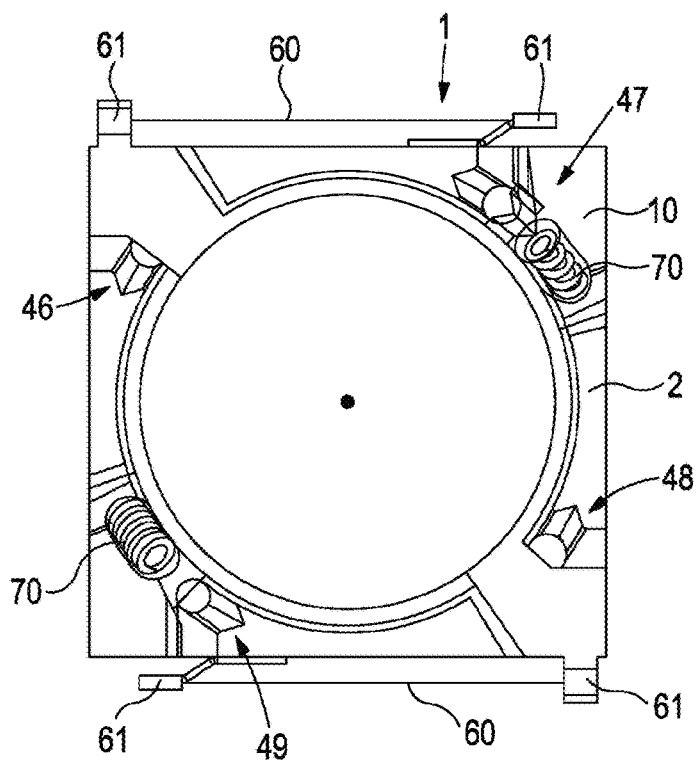
FIG. 40 is a plan view of the SMA actuator apparatus shown in FIG. 38.

In the example of FIGS. 38 to 40, the helical bearing arrangement 20 comprises four helical bearings 46 to 49 with the same arrangement as shown in FIG. 37 and described above.

Also, in the example of FIGS. 38 to 40, the SMA actuation apparatus 1 comprises two SMA actuator wires 60 only and a resilient biasing element 70 providing a resilient biasing force having an arrangement of the type similar to that shown in FIG. 24. One difference is that two SMA actuator wires 60 are provided, but these are arranged, on contraction, to drive rotation of the lens element 2 relative to the support structure in the same sense around the helical axis H, i.e. they provide torques in the same sense around the helical axis H. Thus, the SMA actuator wires 60 are complimentary and apply increased force compared to a single SMA actuator wire 60 but are not opposed in rotation, so that a resilient biasing element is still needed, two resilient biasing elements 70 being present. In this example, the resilient biasing elements 70 extend at an acute angle to the helical axis H and so provides a force with a component along the helical axis H and a component that loads the four helical bearings 46 to 49. The SMA actuator wire 60 extends at a slight angle with respect to a plane normal to the helical axis H.

Also in the example of FIGS. 38 to 40, the angle of the resilient biasing elements 70 can be selected to provide a desired force holding the balls on to the bearing surface, while also providing a biasing force for the SMA actuator wires 60, as described above. Such an angled resilient biasing element may also be used with a different type of bearing, such as a plain bearing, where high forces are undesirable.

Figure 41:
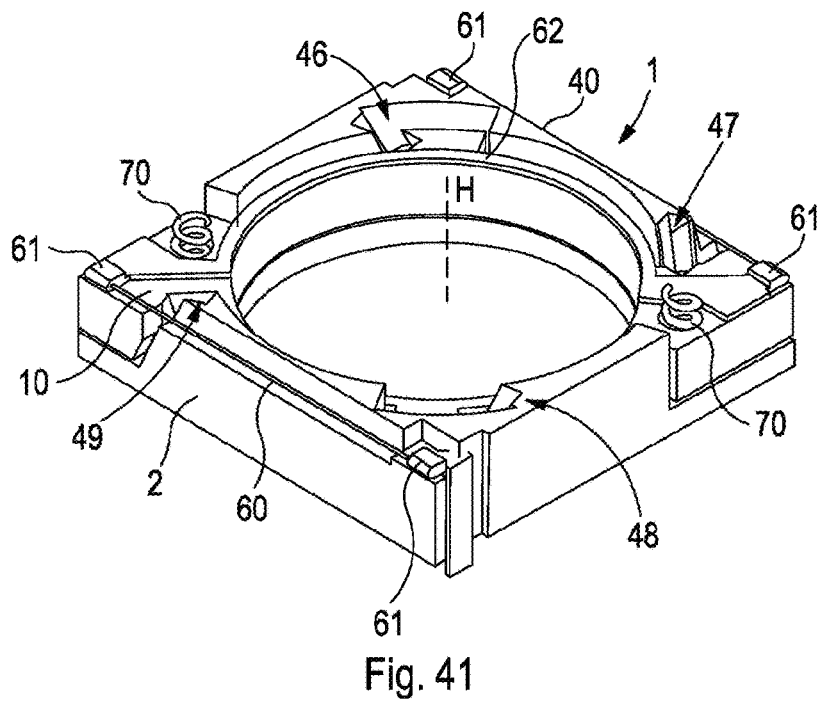
FIG. 41 is a perspective views of a yet further example of the SMA actuator apparatus.
Figure 42:
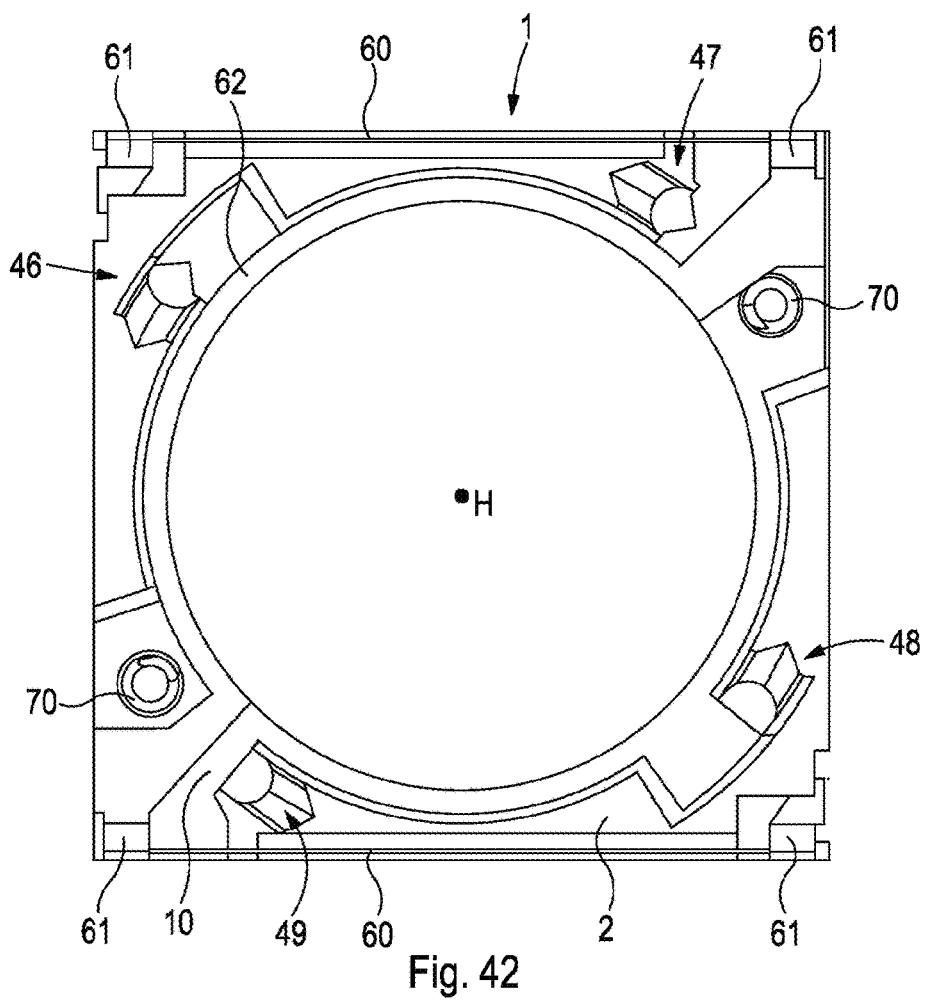
FIG. 42 is a plan view of the SMA actuator apparatus shown in FIG. 40.

In the example of FIGS. 41 and 42, the helical bearing arrangement 20 comprises four helical bearings 46 to 49 with the same arrangement as shown in FIG. 27 and described above.

Also, in the example of FIGS. 41 and 42, the SMA actuation apparatus 1 comprises two SMA actuator wires 60 and two resilient biasing elements 70 providing resilient biasing, having an arrangement of the type similar to that shown in FIG. 26. Similarly to the example of FIGS. 38 to 40, a difference is that two SMA actuator wires 60 are provided, but these are arranged, on contraction, to drive rotation of the lens element 2 relative to the support structure in the same sense around the helical axis H, i.e. they provide torques in the same sense around the helical axis H. Thus, the SMA actuator wires 60 are complimentary and apply increased force compared to a single SMA actuator wire 60 but are not opposed in rotation, so that the resilient biasing element 70 is still needed. In this example, the resilient biasing elements 70 extend parallel to along the helical axis H and so provides a force along the helical axis H. The SMA actuator wire 60 extends at a slight angle to a plane normal to the helical axis H.

In the example of FIGS. 41 and 42, the crimp portions 61 on the lens element 10 are formed integrally with a connection member 62 that provides for electrical connection between the crimp portions 61 across the lens element 10.

Figure 43:
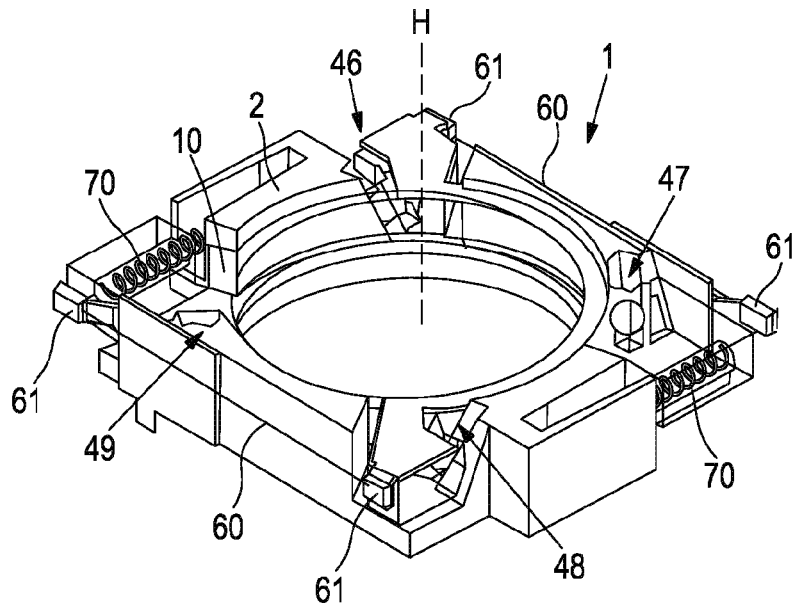
FIG. 43 is a perspective views of a yet further example of the SMA actuator apparatus.
Figure 44:
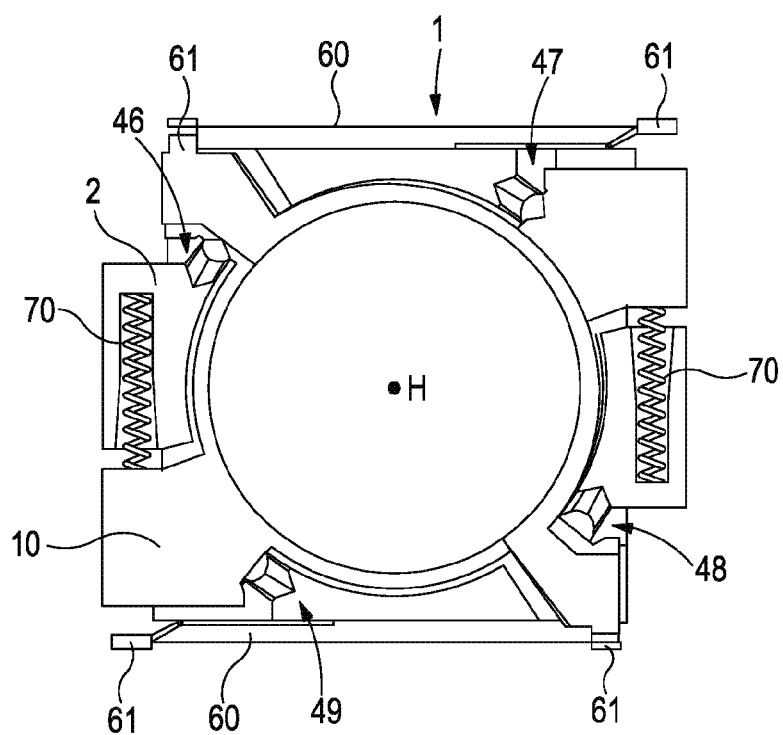
FIG. 44 is a plan view of the SMA actuator apparatus shown in FIG. 43.

In the example of FIGS. 43 and 44, the helical bearing arrangement 20 comprises four helical bearings 46 to 49 with the same arrangement as shown in FIG. 37 and described above.

Also, in the example of FIGS. 43 and 44, the SMA actuation apparatus 1 comprises two SMA actuator wires 60 and two resilient biasing elements providing resilient biasing, having an arrangement of the type shown in FIG. 27. That is, the SMA actuator wires 60 and the resilient biasing elements 70 have rotational symmetry around the helical axis H, and the SMA actuator wires 60 are complimentary and drive rotation of the lens element 10 with respect to the support structure 2 in parallel, that is in the same sense around the helical axis H, and so are actuated together. In this example, the resilient biasing element 70 extends around the helical axis H and provides a force around the helical axis H. The SMA actuator wire 60 extends at a slight angle with respect to a plane normal to the helical axis H.

In the example of FIGS. 43 and 44, the crimp portions 61 on the lens element 10 are formed integrally with a connection member 62 that provides for electrical connection between the crimp portions 61 across the lens element 10.

Figure 45:
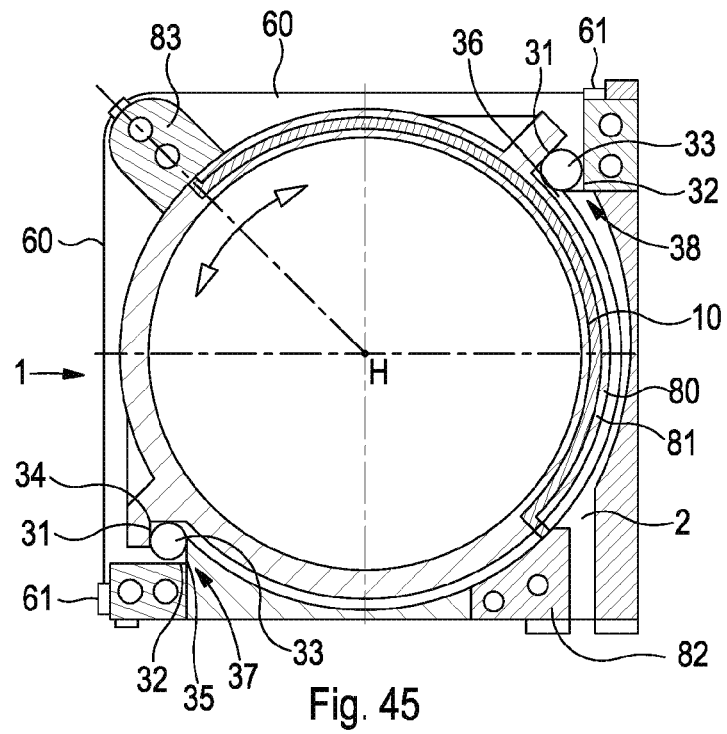
FIGS. 45 and 46 are plan views of further examples of the SMA actuator apparatus.

In the example of FIG. 45, the helical bearing arrangement 20 comprises two helical bearings 37 and 38 with an arrangement of the type shown in FIG. 4 and described above. That is, the first helical bearing 37 comprises bearing surfaces 31 and 32 each comprising respective grooves 34 and 35, with plural rolling bearing elements 33, and the second helical bearing 38 comprises a first bearing surface 31 comprising a groove 36 and a second bearing surface 32 that is planar, with a single rolling bearing element 33.

Also, in the example of FIG. 45, the SMA actuation apparatus 1 comprises a pair of SMA actuator wires 60 having an arrangement of the type shown in FIG. 28. No resilient biasing element is provided, and the pair of SMA actuator wires 60 drive rotation of the lens element 10 in opposite senses around the helical axis H. The pair of SMA actuator wires 60 are arranged on two adjacent sides of the lens element 10 with an angle therebetween of 90 degrees. The SMA actuation apparatus 1 includes an electrical connection element 80 is provided to make an electrical connection from the support structure 2 to the ends of the SMA actuator wire 60 which are connected to the lens element 10. The electrical connection element 80 comprises plates 83 and 82 mounted on the lens element 10 and the support structure 2, respectively, and a flexible connector 81 connecting the plates 83 and 82 across the gap between the lens element 10 and the support structure 2.

Figure 46:
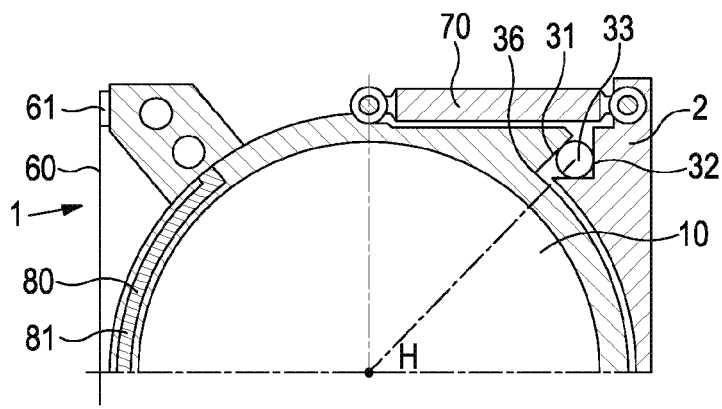

In the example of FIG. 46, the helical bearing arrangement 20 comprises two helical bearings 37 and 38 with the same arrangement as in FIG. 5 (although only partially illustrated in FIG. 46).

Also, in the example of FIG. 46, the SMA actuation apparatus 1 comprises a single SMA actuator wire 60 and a resilient biasing element 70 for providing resilient biasing, having an arrangement of the type shown in FIG. 25 with the resilient biasing element extending around the helical axis H to provide a force around the helical axis H. The SMA actuation apparatus 1 includes an electrical connection element 80 mounted on the lens element 10 and providing an electrical connection from the end of the SMA actuator wire 60 which is connected to the lens element 10 to the support structure 2, in the same manner as the example of FIG. 45.

Figure 47:
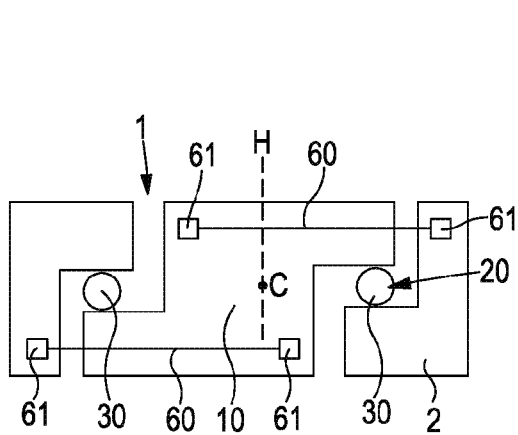
FIG. 47 is a side view of a yet further example of the SMA actuator apparatus.
Figure 48:
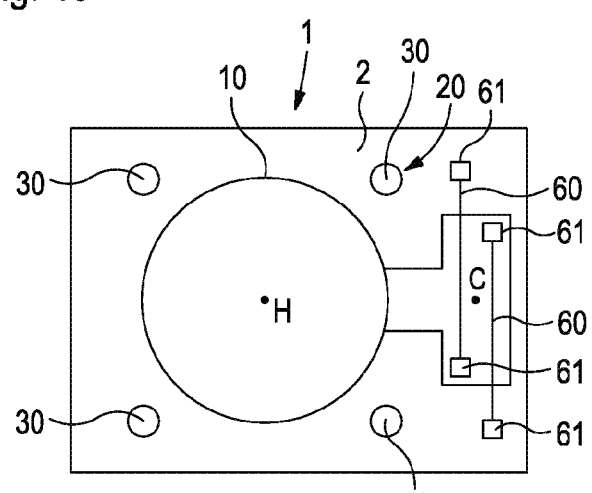
FIG. 48 is a plan view of a yet further example of the SMA actuator apparatus.

FIGS. 47 and 48 show two further examples of the SMA actuator apparatus 1 using two SMA actuator wires 60 to apply a couple to the lens element 10 that loads the helical bearing arrangement 20. In FIGS. 47 and 48, the helical bearing arrangement 20 is shown schematically as comprising plural helical bearings 30, but in general may be any of the examples of the helical bearing arrangement 20 disclosed herein.

In each of the helical bearing arrangement 20, the SMA actuator wires 60 extend between the crimp portions 61 perpendicular to the helical axis H, although that is not essential. The SMA actuator wires 60 apply opposed torques around the helical axis H, as described in more detail for other examples above.

In the example of FIG. 47, the SMA actuator wires 60 are arranged in a plane parallel to the helical axis H, so that the SMA actuator wires 60 are separated along the helical axis H and apply a couple about an axis C that is orthogonal to the helical axis H. That couple loads the helical bearing arrangement 20. In this example, the arrangement of the SMA actuator wires 60 minimises the footprint of the SMA actuation apparatus 1 in a plane orthogonal to the helical axis H.

In the example of FIG. 48, the SMA actuator wires 60 are arranged in a plane orthogonal to the helical axis H, so that the SMA actuator wires 60 are separated orthogonally to the helical axis H and apply a couple about an axis C that is parallel to the helical axis H. Again, that couple loads the helical bearing arrangement 20. In this example, the arrangement of the SMA actuator wires 60 minimises the height of the SMA actuation apparatus 1 along the helical axis H.

FIGS. 49 to 57 are schematic views of yet further examples of the SMA actuator apparatus 1.

The examples of FIGS. 49 to 57 have common features as will now be described.

In each of the examples of FIGS. 49 to 57, the helical bearing arrangement 20 comprises two helical bearings 37 and 38 having a similar arrangement to that shown in FIG. 4. The above description applies to the examples of FIGS. 49 to 57, except for the modifications described below. Thus, the first helical bearing 37 is of the same type as the helical bearing 30 shown in FIG. 2 wherein the bearing surfaces 31 and 32 each comprise respective grooves 34 and 35, and the second helical bearing 38 is of the same type as the helical bearing 30 shown in FIG. 3 wherein the first bearing surface 31 comprises a groove 36 in which the rolling bearing elements 33 are seated and the second bearing surface 32 is planar. For clarity, FIGS. 49 to 57 are schematic plan views normal to the helical axis H, but the two helical bearings 37 and 38 extend helically as described above.

In each of FIGS. 49 to 57, the first helical bearing 37 and the second helical bearing 38 each include one or more rolling bearing elements 33 (not shown in the drawings for clarity) to constrain the relative movement of the lens element 10 and the support structure 2, e.g. three rolling bearing elements 33, the middle one of which may act merely as a spacer and so not contact the bearing surfaces 31, 32.

FIGS. 49 to 57 schematically illustrate which of the bearing surfaces 31 and 32 of the first and second helical bearings 37 and 38 are on the support structure 2 and the lens element 10, as well as their respective orientations. In each case, the first bearing surfaces 31 of the first and second helical bearings 37 and 38 is on the support structure 2, but it could alternatively be on the lens element 10.

In each of the examples of FIGS. 49 to 57, the SMA actuation apparatus 1 comprises a pair of SMA actuator wires 60 that are arranged to drive rotation of the lens element 10 in opposite senses around the helical axis H, the pair of SMA actuator wires 60 having an arrangement that is in each case the same as one of the examples of FIGS. 29 to 30. Specifically, in each case each SMA actuator wire 60 is connected between the support structure 2 and the lens element 10 in the respective orientations shown schematically in the drawings.

The specific arrangements of the examples of FIGS. 49 to 57 will now be described.

Figure 49:
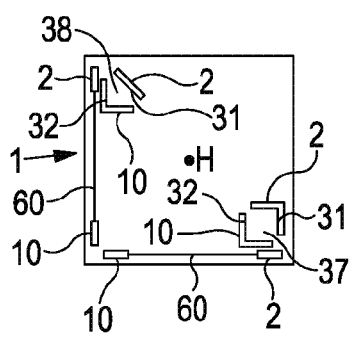
FIGS. 49 to 57 are schematic views of yet further examples of the SMA actuator apparatus.

In the example of FIG. 49, the pair of SMA actuator wires 60 have the same arrangement as in the example of FIG. 30, wherein the pair of SMA actuator wires 60 on two adjacent sides of the lens element 10 and having an angle therebetween of 90 degrees. Thus, the pair of SMA actuator wires 60 apply a net force in a direction bisecting the SMA actuator wires 60, that is diagonally at 450 in FIG. 49.

The first and second helical bearings 37 and 38 are arranged in corners of the SMA actuation apparatus 1 adjacent the ends of SMA actuator wires 60, and so are separated in a direction orthogonal to the net force applied by the pair of SMA actuator wires 60. The first and second helical bearings 37 and 38 are oriented so that the helical bearing arrangement 20 is loaded by the pair of SMA actuator wires 60.

This design is quite tolerant to changes in parameters caused by tolerance during manufacture. This design has relatively high bearing forces in normal use, which is undesirable, but may be acceptable as all the bearing forces are relatively even. This design has an advantage of reducing tilt due to the placement of first and second helical bearings 37 and 38 at opposite corners. There is plenty of space for other components around the two sides without SMA actuator wires, such as circuits, crimps and wires.

Figure 50:
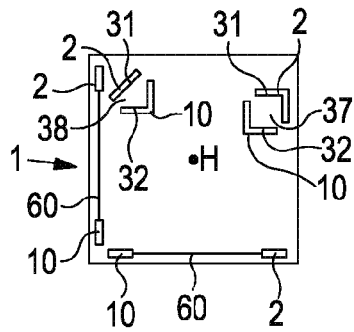

In the example of FIG. 50, the pair of SMA actuator wires 60 have the same arrangement as in the example of FIG. 30, wherein the pair of SMA actuator wires 60 on two adjacent sides of the lens element 10 and having an angle therebetween of 90 degrees. Thus, the pair of SMA actuator wires 60 apply a net force in a direction bisecting the SMA actuator wires 60, that is diagonally at 450 in FIG. 49.

The first helical bearing 37 is arranged in a corner of the SMA actuation apparatus aligned with the net force from the pair of SMA actuator wires 60 and the second helical bearing 38 is arranged in a corner of the SMA actuation apparatus 1 adjacent the ends of one of the pair of SMA actuator wires 60. The first and second helical bearings 37 and 38 are oriented so that the helical bearing arrangement 20 is loaded by the pair of SMA actuator wires 60.

Advantageously, this design has quite low bearing forces, which is good, but bearing forces are uneven. This design may have a greater amount of tilt. There is plenty of space for other components and space usage is good as there are few overlapping parts. However, this design is not tolerant to changes in parameters caused by tolerance during manufacture.

Figure 51:
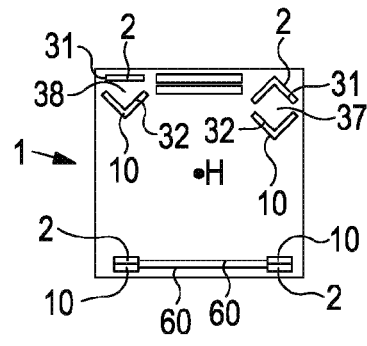

In the example of FIG. 51, the pair of SMA actuator wires 60 have the same arrangement as in the example of FIG. 29, wherein the pair of SMA actuator wires 60 are arranged on the same side of the helical axis H. The pair of SMA actuator wires 60 are parallel, so that they apply a net force with no component perpendicular to the helical axis H. Thus the pair of SMA actuator wires 60 do not load the helical bearing arrangement 20.

The first and second helical bearings 37 and 38 are arranged in corners of the SMA actuation apparatus 1 on the opposite side from the pair of SMA actuator wires 60. The SMA actuation apparatus 1 includes a magnetic loading arrangement 130 arranged to load the first and second helical bearings 37 and 38

This design is quite tolerant to changes in parameters caused by tolerance during manufacture. This design has quite low bearing forces in normal use, all bearing forces are relatively even. This design may permit a relatively large amount of tilt. There is added complexity due to the magnetic loading arrangement, and so added cost, but the arrangement could be used for a zero power autofocus. There is plenty of space to arrange other components.

Figure 52:
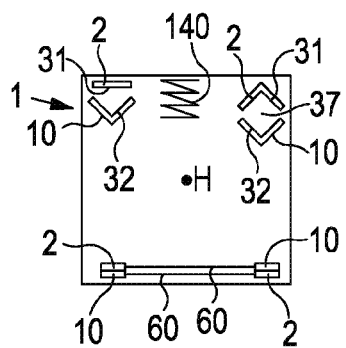
Figure 58:
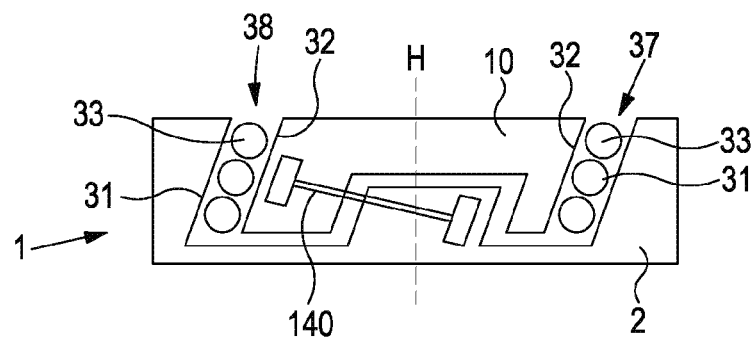
FIG. 58 is a side view of a resilient loading element in the example of the SMA actuator apparatus shown in FIG. 52.

The example of FIG. 52 is the same as the example of FIG. 51 except that the magnetic loading arrangement 130 is replaced by a resilient element 140 arranged between the support structure 2 and lens element 10 so as to load the helical bearing arrangement 20. The spring 140 is shown schematically in FIG. 52 and may have any suitable form, for example as shown in FIG. 58 where the resilient element 140 is a flexure extending between the support structure 2 and lens element 10 so as to provide the loading (into the page in FIG. 58) while accommodating relative lateral movement between the support structure 2 and lens element 10 (up and down in FIG. 58). This example has similar advantages to the example of FIG. 51 Potentially cheaper than the magnet design but with issues caused by the flexure stiffness.

Figure 53:
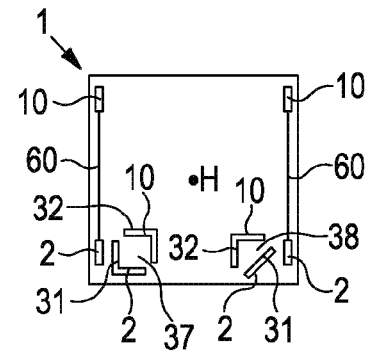

In the example of FIG. 53, the pair of SMA actuator wires 60 have the same arrangement as in the example of FIG. 28, wherein pair of SMA actuator wires 60 are arranged on opposite sides of the helical axis H. Thus, the pair of SMA actuator wires 60 apply a net force in a direction parallel to the SMA actuator wires 60, that is vertically in FIG. 53.

The first and second helical bearings 37 and 38 are arranged in corners of the SMA actuation apparatus 1 adjacent the ends of SMA actuator wires 60, and so are separated in a direction orthogonal to the net force applied by the pair of SMA actuator wires 60. The first and second helical bearings 37 and 38 are oriented so that the helical bearing arrangement 20 is loaded by the pair of SMA actuator wires 60.

This design is tolerant to parameter changes caused by tolerance in manufacture. This design has moderate bearing forces. There is space for other components on the side opposite the first and second helical bearings 37 and 38. This design may have a relatively large amount of tilt due to the bearings being on the same side.

Figure 54:
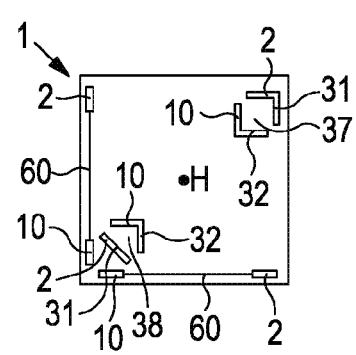

In the example of FIG. 54, the pair of SMA actuator wires 60 have the same arrangement as in the example of FIG. 30, wherein the pair of SMA actuator wires 60 on two adjacent sides of the lens element 10 and having an angle therebetween of 90 degrees.

The first and second helical bearings 37 and 38 are arranged in opposite corners of the SMA actuation apparatus 1 and are aligned with the net force applied by the pair of SMA actuator wires 60.

This design is not tolerant to changes in parameters caused by tolerance during manufacture. This design has moderate bearing forces which are not particularly even. This design may have a reduced amount of tilt. There is plenty of space for other components and space usage is good.

Figure 55:
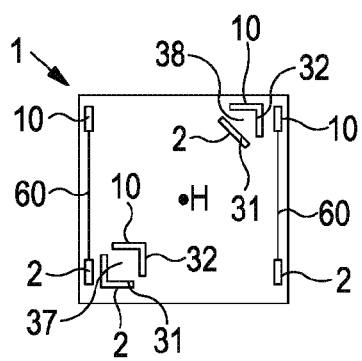

In the example of FIG. 55, the pair of SMA actuator wires 60 have the same arrangement as in the example of FIG. 28, wherein the pair of SMA actuator wires 60 are arranged on opposite sides of the helical axis H. Thus, the pair of SMA actuator wires 60 apply a net force in a direction parallel to the SMA actuator wires 60, that is vertically in FIG. 53.

The first and second helical bearings 37 and 38 are arranged in opposite corners of the SMA actuation apparatus 1. The first and second helical bearings 37 and 38 are oriented so that the helical bearing arrangement 20 is loaded by the pair of SMA actuator wires 60.

This design has relatively high bearing forces but may have reduced tilt due to the arrangement of the first and second helical bearings 37 and 38 in opposite corners. This design is moderately resistant to parameter changes.

Figure 56:
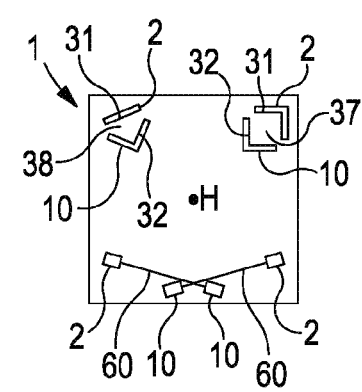

In the example of FIG. 56, the pair of SMA actuator wires 60 have the same arrangement as in the example of FIG. 29, wherein pair of SMA actuator wires 60 are arranged on the same side of the helical axis H. However, rather than being parallel, the pair of SMA actuator wires 60 are inclined with respect to each other so that they apply a net force with a component perpendicular to the helical axis H, that is vertically in FIG. 56.

The first and second helical bearings 37 and 38 are arranged in corners of the SMA actuation apparatus 1 on the opposite side from the pair of SMA actuator wires 60. The first and second helical bearings 37 and 38 are oriented so that the helical bearing arrangement 20 is loaded by the pair of SMA actuator wires 60.

This design has SMA actuator wires 60 of reduced length compared to the previous examples. There is lots of space in this design for other components. Forces in this design are relatively low and relatively even, but the design is not very tolerant to changes in parameters.

Figure 57:
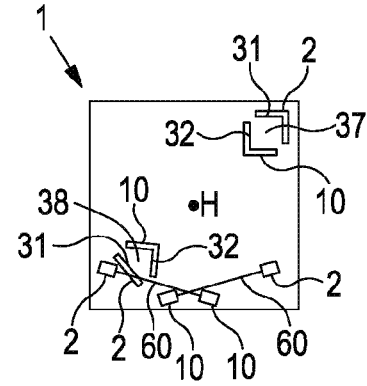

In the example of FIG. 57, the pair of SMA actuator wires 60 have the same arrangement as in the example of FIG. 29, wherein pair of SMA actuator wires 60 are arranged on the same side of the helical axis H. However, rather than being parallel, the pair of SMA actuator wires 60 are inclined with respect to each other so that they apply a net force with a component perpendicular to the helical axis H, that is vertically in FIG. 57.

The first and second helical bearings 37 and 38 are arranged in opposite corners of the SMA actuation apparatus 1. The first and second helical bearings 37 and 38 are oriented so that the helical bearing arrangement 20 is loaded by the pair of SMA actuator wires 60.

This is similar to the example of FIG. 56 but the arrangement of the first and second helical bearings 37 and 38 in opposite corners may reduce the amount of tilt, at the expense of not being as tolerant to changes in parameters.

In all of the examples above, the SMA actuator wires 60 are driven by the control circuit implemented in the IC chip 5. In particular, the control circuit generates drive signals for each of the SMA actuator wires 60 and supplies the drive signals to the SMA actuator wires 60. The control circuit receives an input signal representing a desired position for the lens element 10 along the optical axis O and generates drive signals selected to drive the lens element 10 to the desired position. The drive signals may be generated using a resistance feedback control technique, in which case the control circuit 20 measures the resistance of the lengths of SMA actuator wire 20 and uses the measured resistance as a feedback signal to control the power of the drive signals. Such a resistance feedback control technique may be implemented as disclosed in any of WO-2013/175197; WO-2014/076463; WO-2012/066285; WO-2012/020212; WO-2011/104518; WO-2012/038703; WO-2010/089529 or WO-2010029316, each of which is incorporated herein by reference. As an alternative, the control circuit may include a sensor which senses the position of the lens element 10, for example a Hall sensor which sense the position of a magnet fixed to the lens element 10. In this case, the drive signals use the sensed position as a feedback signal to control the power of the drive signals.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A shape memory alloy actuation apparatus comprising:
a support structure;
a movable element;
a helical bearing arrangement supporting the movable element on the support structure and defining a helical bearing surface arranged to guide helical movement of the movable element, with respect to the support structure, around a helical axis; and
at least one shape memory alloy actuator wire connected between the support structure and the movable element, wherein:
the shape memory alloy actuator wire extends (i) in a plane normal to the helical axis or (ii) in a plane at an acute angle to a plane normal to the helical axis;
the shape memory alloy actuator wire is arranged, on contraction, to drive rotation of the movable element relative to the support structure around the helical axis; and
wherein the helical bearing surface of the helical bearing arrangement converts the driven rotation of the movable element into the helical movement such that the moveable element translates relative to the support structure along the helical axis;
wherein the helical bearing arrangement comprises at least one helical bearing that is a rolling bearing comprising bearing surfaces on the support structure and the movable element, the bearing surfaces including the helical bearing surface, the helical bearing arrangement further comprising at least one rolling bearing element disposed between the bearing surfaces.

2. The shape memory alloy actuation apparatus according to claim 1, wherein the helical bearing arrangement comprises a plurality of helical bearings that are rolling bearings.

3. The shape memory alloy actuation apparatus according to claim 2, wherein at least one helical bearing comprises a plurality of rolling bearing elements.

4. The shape memory alloy actuation apparatus according to claim 1, wherein the bearing arrangement comprises two helical bearings only.

5. The shape memory alloy actuation apparatus according to claim 4, wherein:
the bearing surfaces of a first helical bearing comprise grooves on each of the support structure and the movable element; and
the bearing surfaces of a second helical bearing comprise either (i) a groove on the support structures; and a planar surface on the movable element; or (ii) a groove on the movable element; and a planar surface on the support structure.

6. The shape memory alloy actuation apparatus according to claim 2, wherein the bearing arrangement comprises three helical bearings.

7. The shape memory alloy actuation apparatus according to claim 6, wherein:

the bearing surfaces of first and second helical bearings each comprise grooves on each of the support structure and the movable element; and
the bearing surfaces of a third helical bearing comprise either (i) a groove on the support structures; and a planar surface on the movable element; or (ii) a groove on the movable element; and a planar surface on the support structure.

8. The shape memory alloy actuation apparatus according to claim 7, wherein the first, second, and third helical bearings each comprise a single rolling element only.

9. The shape memory alloy actuation apparatus according to claim 6, wherein:
first and second helical bearings are arranged so that the bearing surfaces on the movable element are respectively above and below the bearing surfaces on the support structure, as viewed along the helical axis; and
a third helical bearings is arranged so that the bearing surfaces on the movable element is above the bearing surfaces on the support structure, as viewed along the helical axis.

10. The shape memory alloy actuation apparatus according to claim 1, wherein the shape memory alloy actuation apparatus further comprises a loading arrangement that loads at least one of the bearing surfaces against the rolling bearing element.

11. The shape memory alloy actuation apparatus according to claim 10, wherein the loading arrangement is a resilient loading arrangement that resiliently loads at least one of the bearing surfaces against the rolling bearing element.

12. The shape memory alloy actuation apparatus according to claim 10, wherein the loading arrangement comprises a resilient element connected between the support structure and the movable element.

13. The shape memory alloy actuation apparatus according to claim 10, wherein the loading arrangement is a magnetic loading arrangement.

14. A shape memory alloy actuation apparatus, comprising:
a support structure;
a movable element;
a helical bearing arrangement supporting the movable element on the support structure and defining a helical bearing surface arranged to guide helical movement of the movable element, with respect to the support structure, around a helical axis; and
at least one shape memory alloy actuator wire connected between the support structure and the movable element, wherein:
the shape memory alloy actuator wire extends (i) in a plane normal to the helical axis or (ii) in a plane at an acute angle to a plane normal to the helical axis;
the shape memory alloy actuator wire is arranged, on contraction, to drive rotation of the movable element relative to the support structure around the helical axis; and
wherein the helical bearing surface of the helical bearing arrangement converts the driven rotation of the movable element into the helical movement such that the moveable element translates relative to the support structure along the helical axis;
wherein the helical bearing arrangement comprises at least one flexure extending between the support structure and the movable element.

15. The shape memory alloy actuation apparatus according to claim 14, wherein the at least one flexure extends in an arc around the helical axis and is pre deflected along the helical axis.

16. The shape memory alloy actuation apparatus according to claim 14, wherein the at least one flexure comprises a plurality of flexures that extend along the helical axis and are inclined with respect to a plane perpendicular to the helical axis with rotational symmetry around the helical axis.

17. The shape memory alloy actuation apparatus according to claim 14, wherein the helical bearing arrangement further comprises a support plate mounted on the support structure and a movable plate mounted on movable element, the at least one flexure being integrally formed with the support plate and the movable plate.

18. The shape memory alloy actuation apparatus according to claim 1, wherein, projected along the helical axis, the extent of the shape memory alloy actuator wire is no greater than the extent of the helical bearing arrangement.

19. The shape memory alloy actuation apparatus according to claim 2, wherein the at least one shape memory alloy actuator wire is arranged to apply a force to the movable element that loads the helical bearing arrangement.

20. The shape memory alloy actuation apparatus according to claim 1, wherein the at least one shape memory alloy actuator wire comprises at least two shape memory alloy actuator wires arranged to apply a couple to the movable element that loads the helical bearing arrangement.

21. The shape memory alloy actuation apparatus according to claim 1, wherein the at least one shape memory alloy actuator wire is perpendicular to the helical axis.

22. The shape memory alloy actuation apparatus according to claim 1, wherein the at least one shape memory alloy actuator wire extends at an acute angle to a plane normal to the helical axis.

23. The shape memory alloy actuation apparatus according to claim 1, wherein the at least one shape memory alloy actuator wire is arranged, on contraction, to drive rotation of the movable element around the helical axis by less than 90 degrees.

24. The shape memory alloy actuation apparatus according to claim 1, wherein the shape memory alloy actuation apparatus further comprises a resilient biasing element connected between the support structure and the movable element and arranged to resiliently bias the at least one shape memory alloy actuator wire.

25. The shape memory alloy actuation apparatus according to claim 1, wherein the at least one shape memory alloy actuator wire comprises at least one pair of shape memory alloy actuator wires arranged, on contraction, to drive rotation of the movable element in opposite senses around the helical axis.

26. The shape memory alloy actuation apparatus according to claim 25, wherein the pair of shape memory alloy actuator wires are arranged on opposite sides of the helical axis.

27. The shape memory alloy actuation apparatus according to claim 25, wherein the pair of shape memory alloy actuator wires are arranged on the same side of the helical axis.

28. The shape memory alloy actuation apparatus according to claim 25, wherein the pair of shape memory alloy actuator wires have an angle therebetween in the range from 70 to 110 degrees as viewed along the helical axis.

29. The shape memory alloy actuation apparatus according to claim 1, wherein the movable element is a lens element comprising at least one lens, wherein the helical axis is an optical axis of the lens element.

30. The shape memory alloy actuation apparatus according to claim 29, wherein the at least one lens has a diameter of at most 20 mm.

31. The shape memory alloy actuation apparatus according to claim 1, wherein the rolling bearing comprises the helical bearing surface and wherein the at least one rolling bearing element is in contact with the helical bearing surface and configured to roll along the helical bearing surface.

\* \* \* \* \*